June 20, 1944.  A. F. POTT  2,352,006
PRINTING-CALCULATING MACHINE
Original Filed April 5, 1935   20 Sheets-Sheet 1

Inventor:
A. F. Pott
By Glascock, Downing & Seebold
Attys.

June 20, 1944.  A. F. POTT  2,352,006
PRINTING-CALCULATING MACHINE
Original Filed April 5, 1935    20 Sheets-Sheet 4

Inventor:
A. F. Pott
By: Glascock Downing & Seebold Attys

June 20, 1944.   A. F. POTT   2,352,006
PRINTING-CALCULATING MACHINE
Original Filed April 5, 1935   20 Sheets-Sheet 5

Inventor:
A. F. Pott
By: Glascock Downing & Seebold

June 20, 1944. A. F. POTT 2,352,006
PRINTING-CALCULATING MACHINE
Original Filed April 5, 1935 20 Sheets-Sheet 7

Inventor:
A. F. Pott
By Glascock Downing & Seebold

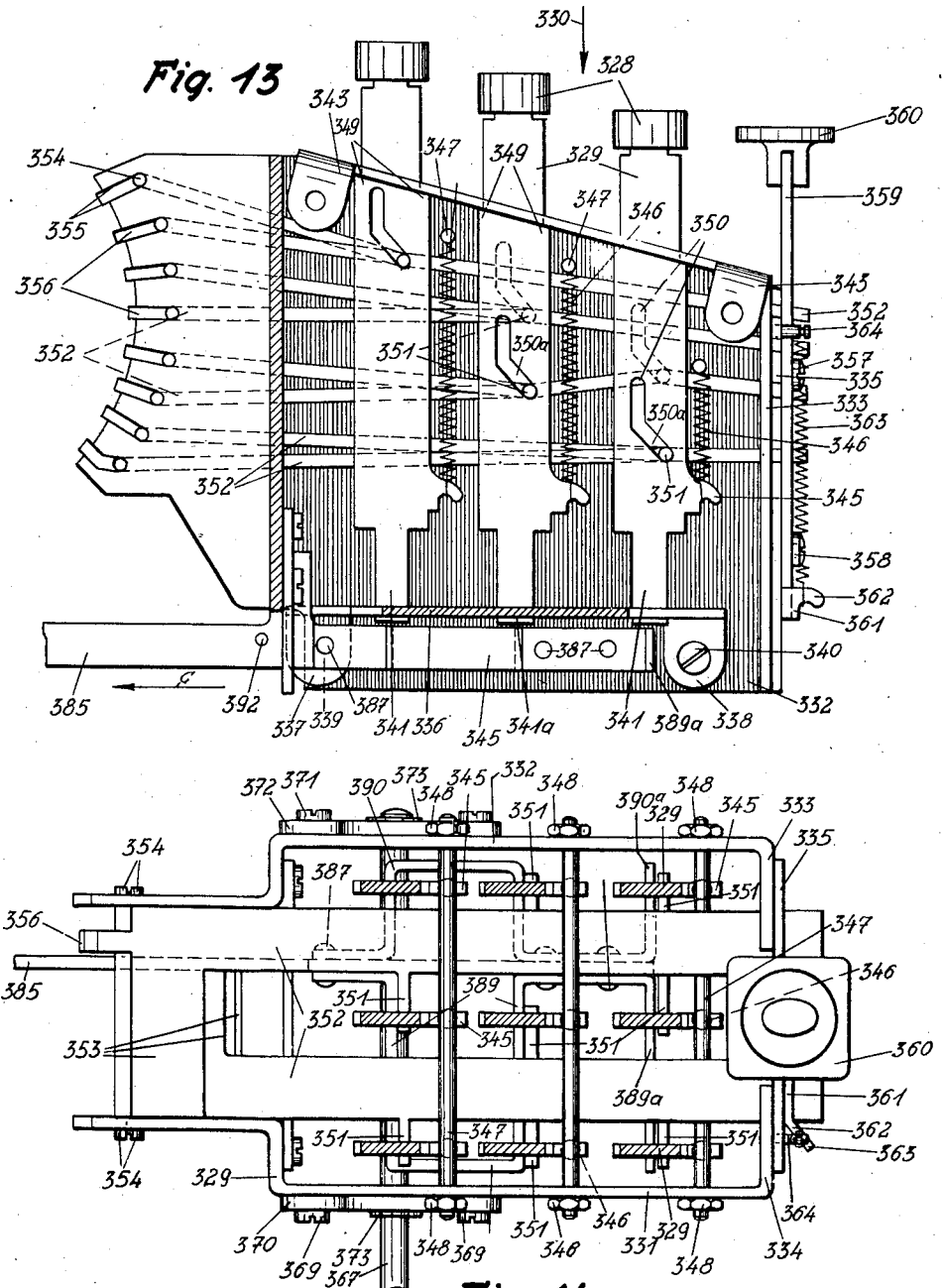

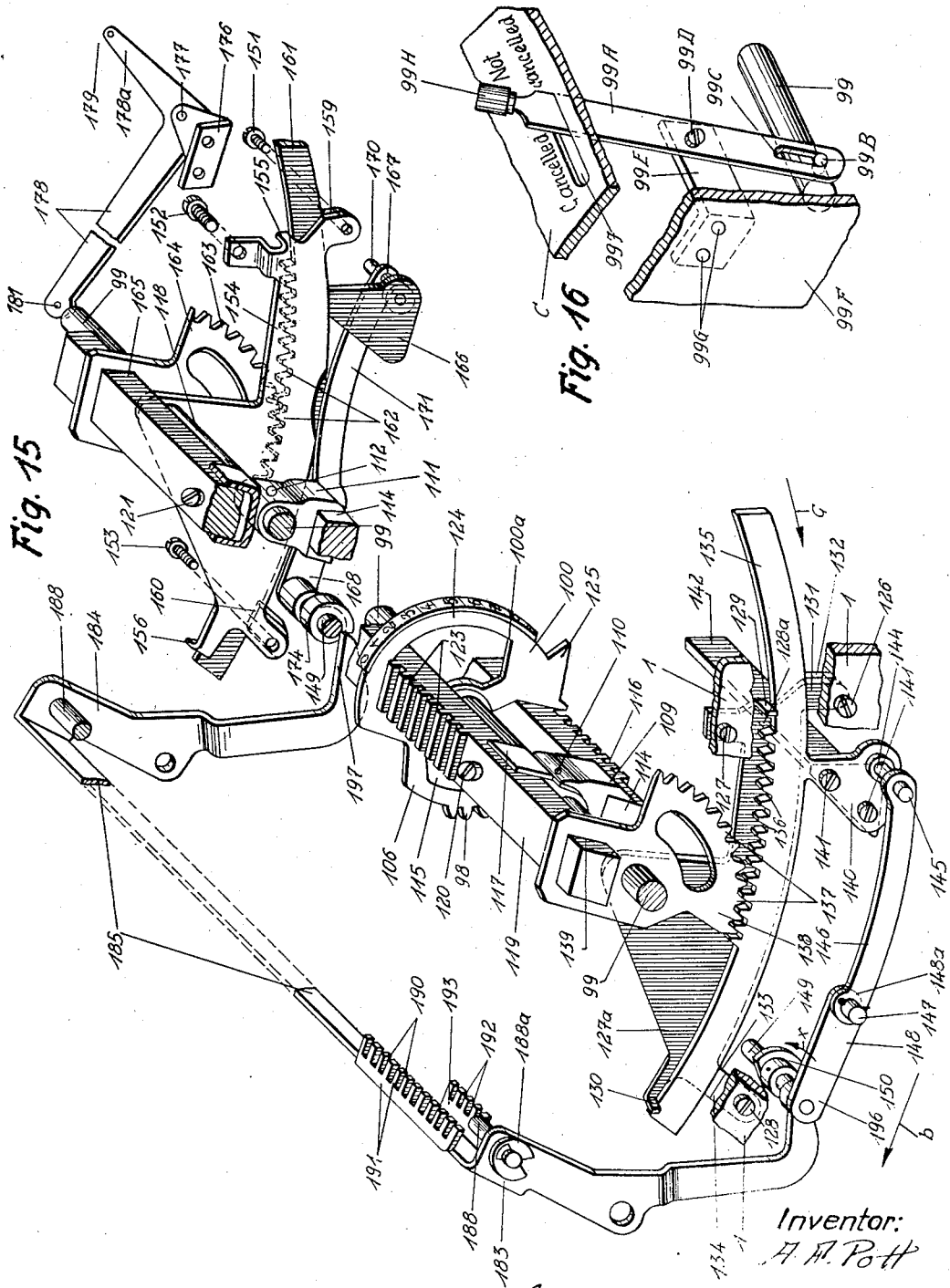

June 20, 1944.　　　A. F. POTT　　　2,352,006
PRINTING-CALCULATING MACHINE
Original Filed April 5, 1935　　20 Sheets-Sheet 10

Inventor:
A. F. Pott
By: Glascock Downing & Seebold

June 20, 1944.  A. F. POTT  2,352,006
PRINTING-CALCULATING MACHINE
Original Filed April 5, 1935  20 Sheets-Sheet 12
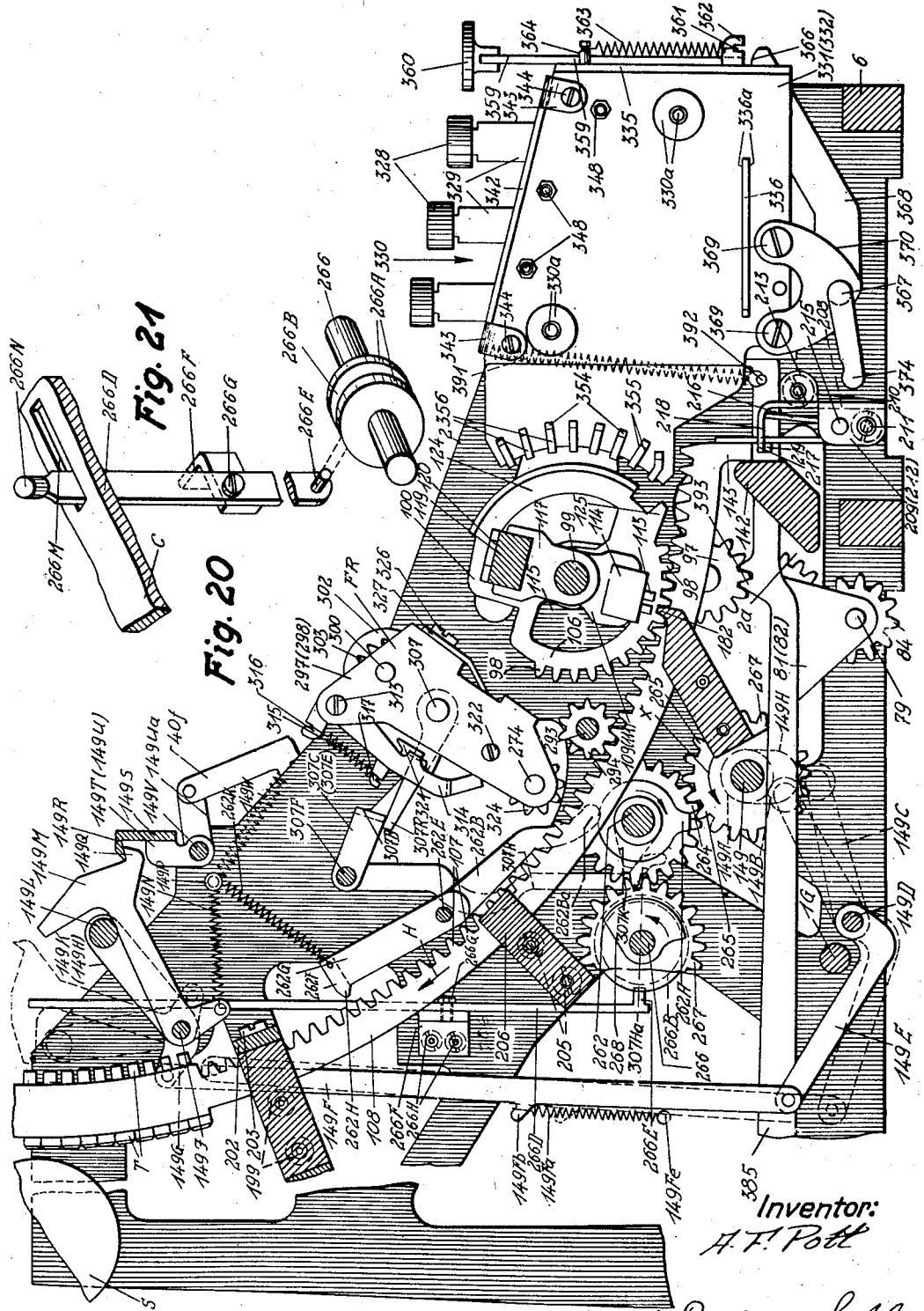
Inventor:
A. F. Pott
By: Glascock Downing & Seibold
Attys.

June 20, 1944.     A. F. POTT     2,352,006
PRINTING-CALCULATING MACHINE
Original Filed April 5, 1935     20 Sheets-Sheet 16

Inventor:
A. F. Pott
By: Glascock Downing & Seebold
Attys.

June 20, 1944. A. F. POTT 2,352,006
PRINTING-CALCULATING MACHINE
Original Filed April 5, 1935 20 Sheets-Sheet 17
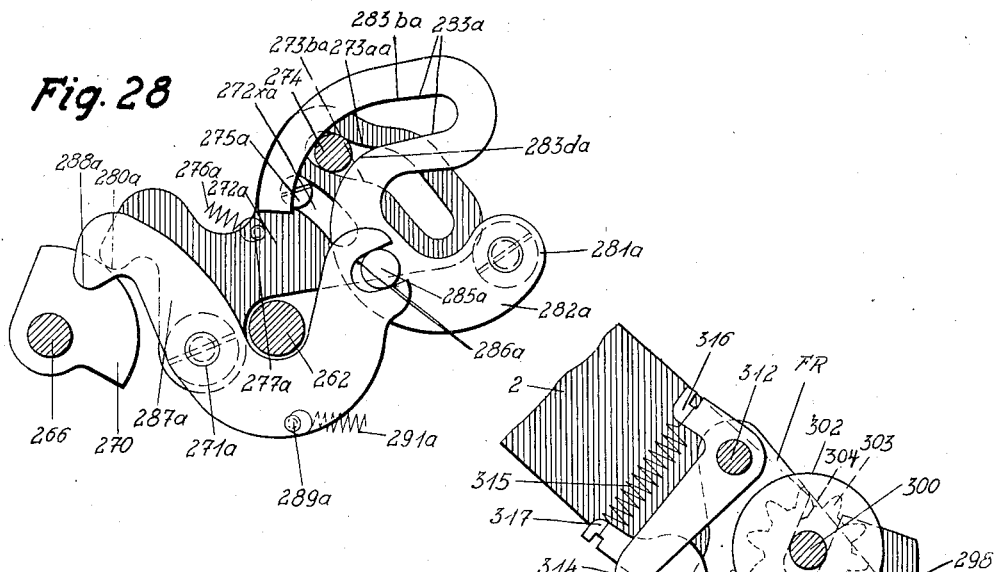
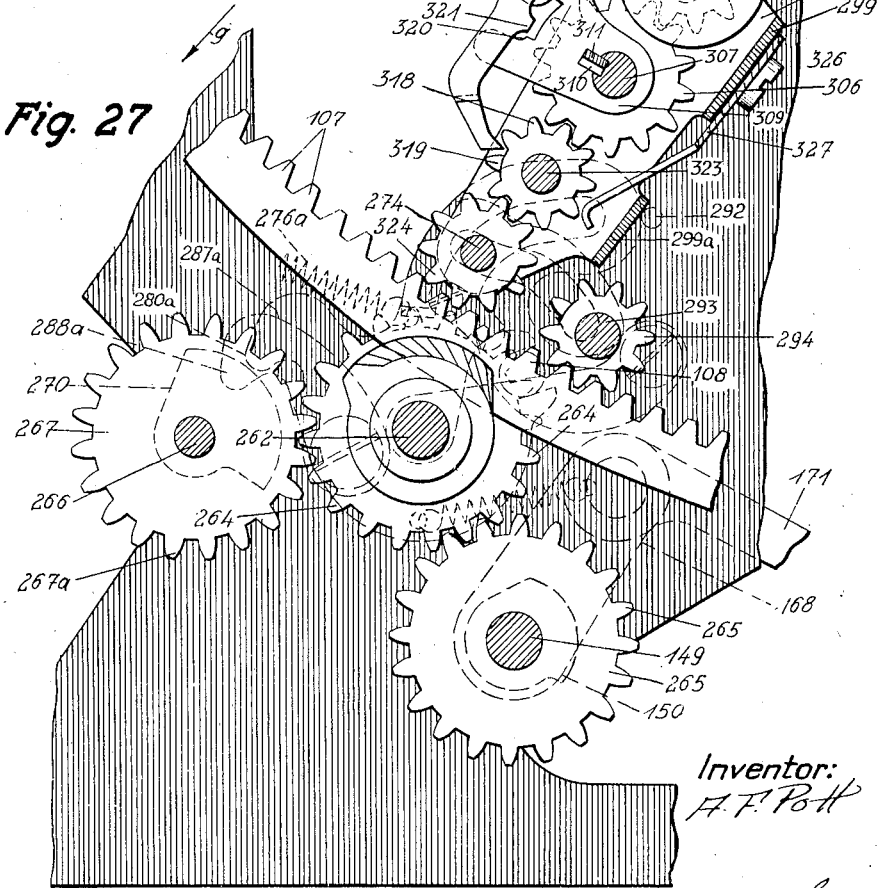
Inventor:
A. F. Pott
By: Glascock Downing & Seebold June 20, 1944.   A. F. POTT   2,352,006
PRINTING-CALCULATING MACHINE
Original Filed April 5, 1935   20 Sheets-Sheet 19
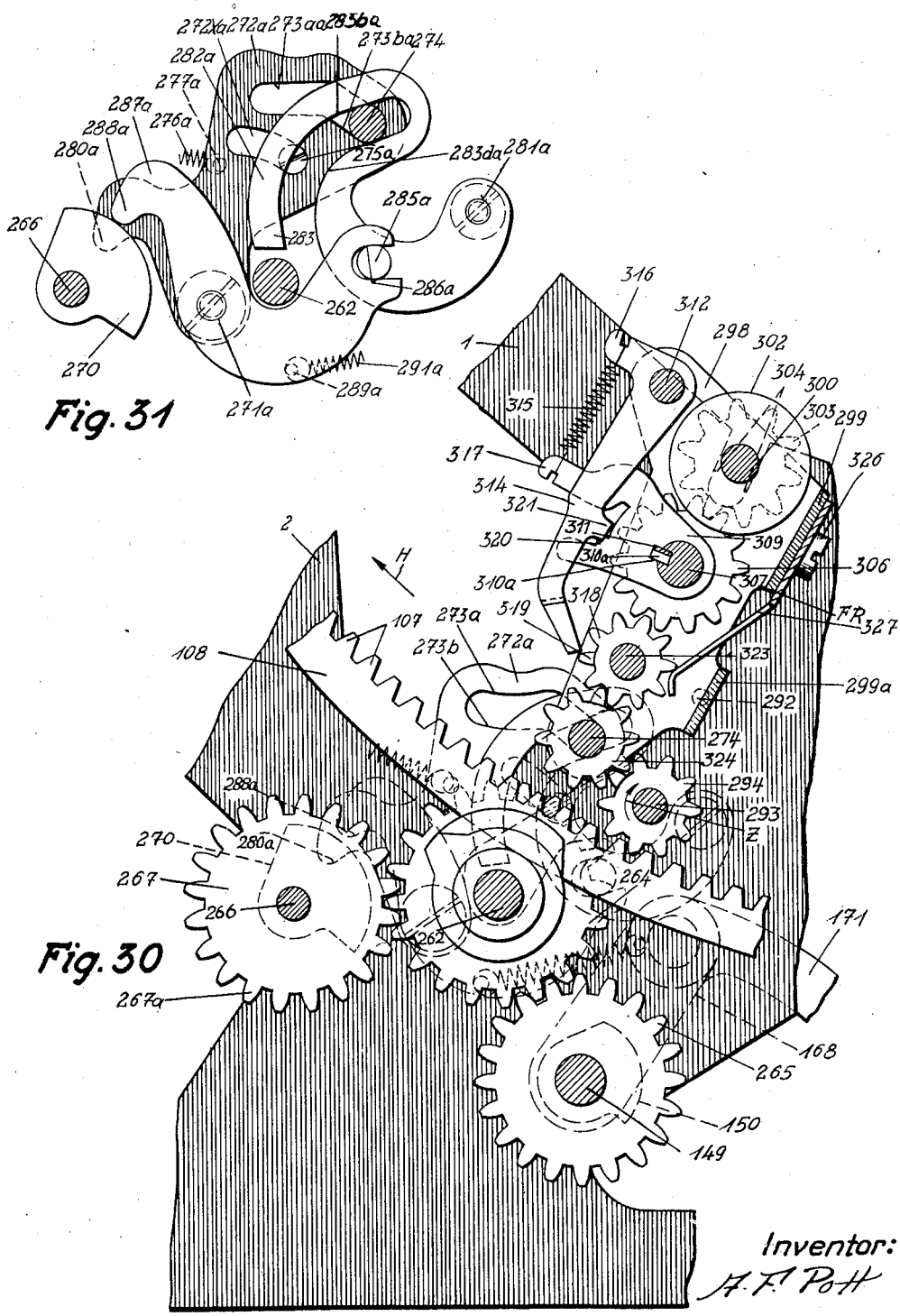

Patented June 20, 1944

2,352,006

UNITED STATES PATENT OFFICE 2,352,006

PRINTING-CALCULATING MACHINE

August Friedrich Pott, Zella-Mehlis, Germany; vested in the Alien Property Custodian Continuation of application Serial No. 14,898, April 5, 1935. This application October 30, 1940, Serial No. 363,552. In Germany April 18, 1934

3 Claims. (Cl. 235—62)

This application is a continuation of my application Ser. No. 14,898, filed April 5, 1935, and relates to printing calculating machines, adding machines, cash registers and the like.

In the previously known machines several groups of levers, toothed segments or the like were necessary for the transmission of the values to the totalizer and to the printing mechanism, and therefore the machines were bulky and expensive to construct and besides were not well suited for performing multiplication.

According to the present invention these disadvantages are now obviated by effecting the setting of the printing member, the drive of the calculating member, and the driving connection with the value setting member by means of a common member. This consists, moreover, advatageously of a circular ring portion having its arc struck with the smaller radius turned away from the platen.

In the drawings, one example of construction of the invention is represented:

Fig. 13 is a section of the key board viewed in the direction of arrow A on the line 13—13 of Fig. 4.

Fig. 14 is a top view of the keyboard in which the cover plate and the base-plate are removed.

Fig. 15 is a perspective view from the left-hand front of the machine, of the arrangement of the setting and indicating wheels as well as the mechanisms which returns the setting and indicating wheels to their rest positions, in which view different parts for the sake of clearness are separated from one another.

Fig. 16 is a perspective of the hand operated lever 99A taken from the left-hand front of the machine.

Fig. 20 is a section according to the line 20—20 of Fig. 4 and viewed in the direction of arrow A in which view the mechanisms are shown in the rest position and different mechanisms are omitted in order to disclose others.

Fig. 21 is a perspective detail of Fig. 20, viewed from the left-hand front of the machine.

Figs. 26 to 32 are detail views showing different positions assumed by the totalizer, the tens transfer mechanisms, and the cams controlling the totalizer and the tens transfer mechanisms in which figures—

Fig. 26 shows the rest position of the totalizer.

Fig. 27 shows the position after engagement of the totalizer wheels with the actuator sectors in the additive calculating process.

Fig. 28 is a side elevation of a detail of Fig. 27.

Fig. 29 shows the position during additive tens transfer in which the value has been registered in the totalizer, and the totalizer is out of engagement with the actuator sectors.

Fig. 30 shows the position after engagement of the totalizer wheels with the change-over wheels in the subtractive calculation process.

Fig. 31 is a side elevation of a detail of Fig. 30.

Fig. 32 shows the position during subtractive tens transfer in which the value has been registered in the totalizer and the latter is out of engagement again with the actuator sectors and in the subtraction position.

*General description*

Figures 1, 2:
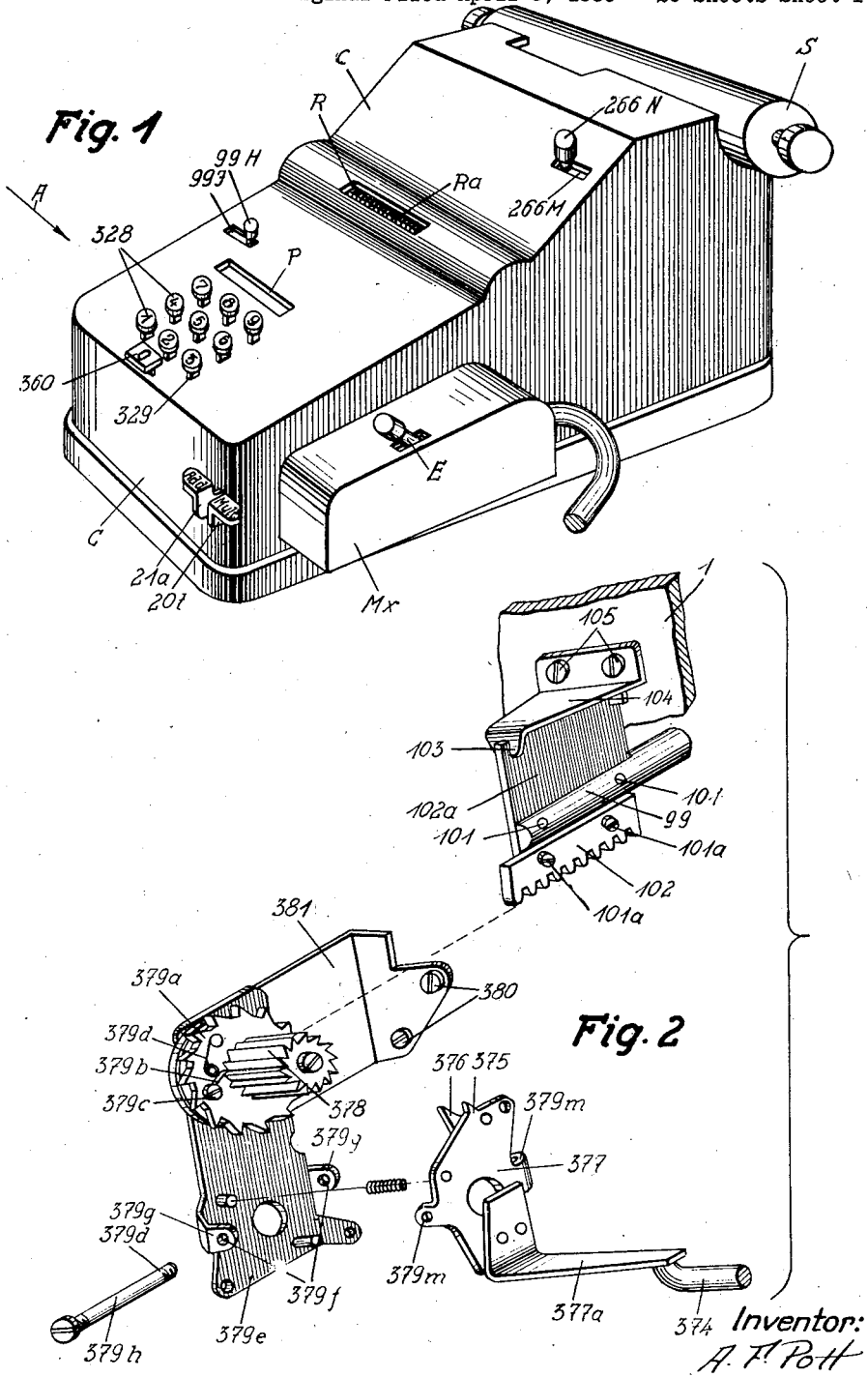
Fig. 1 shows a front view in perspective of the complete machine.
Fig. 2 shows a detail in perspective of a portion of Fig. 3 in which the parts for the sake of clearness are shown separated from one another.

The motor M (Fig. 7) which is arranged in a housing of the machine (Fig. 1) is removably attached on the right hand side of the machine.

The left and the right-hand side walls 1 and 2 of the machine are connected by bridge members 4, 5 and 6 (Fig. 3) secured by screws 7 so that the parts 1, 2, 4, 5 and 6 form a rigid structure. A U-shaped plate 8 is secured to the right-hand side wall 2 partly by a screw 9 (Fig. 7) passing through a distance tube 10 arranged between the wall 2 and the plate 8 as well as through a hole 8a (Figs. 8 and 9) located in the long limb of the plate 8, and partly by a screw 11 (Fig. 7) also passing through a distance tube 12 arranged between the wall 2 and the plate 8 as well as through a hole 8b (Figs. 8 and 9) located in the long limb of the plate 8. A large hole 8c (Figs. 8 and 9) is located in the short limb of the plate 8 in position for facilitating introduction of the screw 9.

The motor M (Figs. 7 and 8) is rigidly mounted partly on the short limb of the plate 8 by means of a screw 13, and partly on the forwardly directed end of the long limb of the plate 8 by screws 14 and 15 (Fig. 8) projecting through elongated holes 16 and 17 in an angle member 18 (Figs. 7 and 8) rigidly mounted on the motor M.

Figure 7:
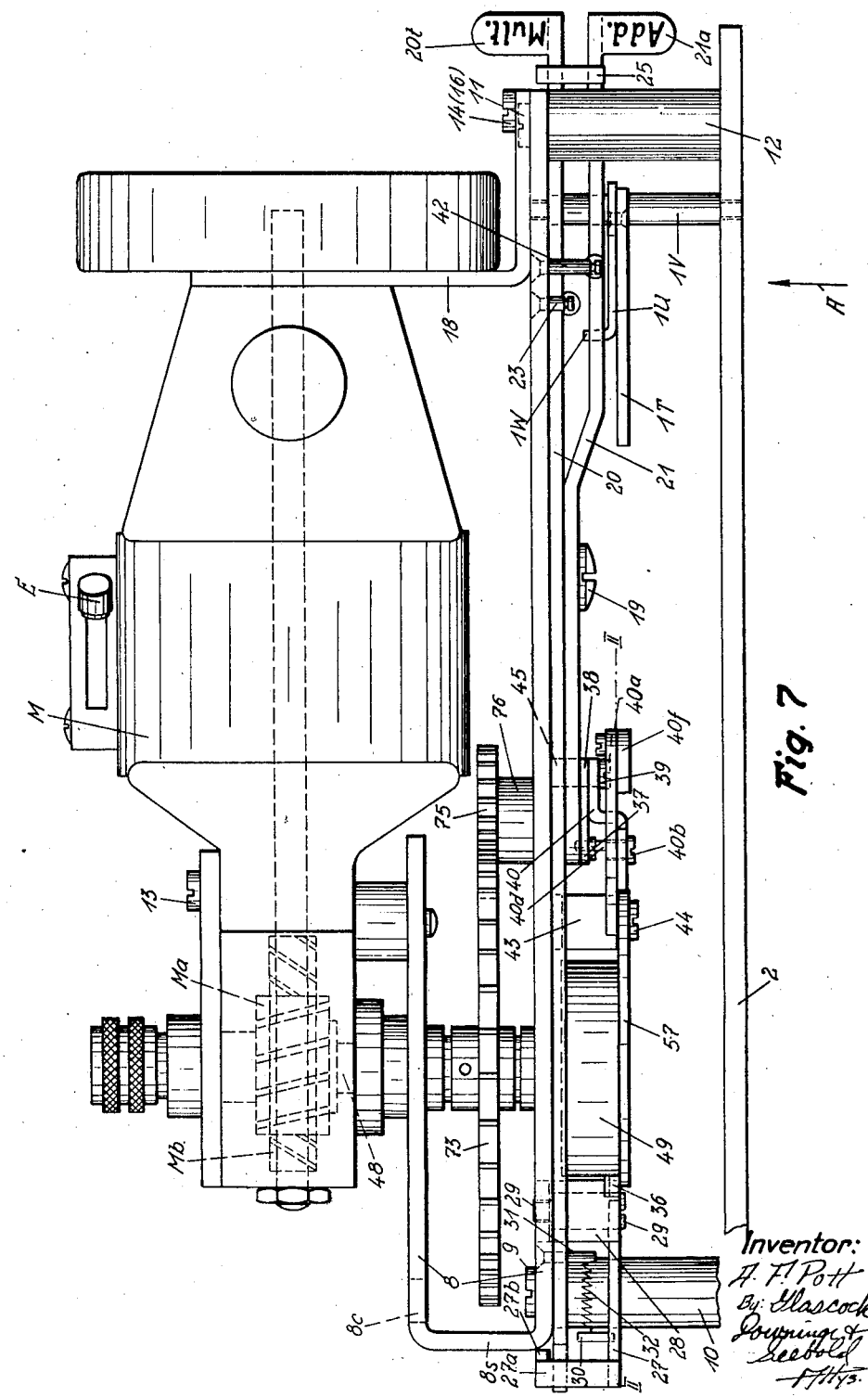
Fig. 7 is an enlarged top plan of the coupling mechanism in the rest position showing the mounting of the motor on the right-hand machine wall.

A key lever 20 is pivotally mounted at 19 on the plate 8, and is bent upwardly and laterally at its front end and provided with the marking "Mult." A key lever 21 is also pivotally mounted at 19 and the upwardly directed front end thereof is bent at right-angles to the left of the key lever 21, and provided with the marking "Add" (Fig. 7). A spring 22 (Figs. 7 and 9) connected at 23 and 24 with the plate 8 and lever 20, respectively, normally tends to turn said lever 20 in the anti-clockwise direction round the screw 19, and the normal position of the lever is determined by its lower edge 20a striking against the bridge of a U-shaped part 28 of a pawl 27.

The projection 26 at the rear end of the key lever 20 is capable of acting upwards against the bridge 27a of the U-shaped part 27b of the clutch-disabling dog 27 and the U-shaped part 28 thereof is pivoted at 29. The clutch-disabling dog 27 is always acted upon in the anti-clockwise direction round the pivot 29 by a spring 32 connected at 30 and 31 and its normal position is determined by the depending long limb of its rearward U-shaped part 27b striking against the bridge 8s (Figs. 7 and 8) of the plate 8. The downwardly directed part 34 of the clutch-disabling dog 27 carries a nose 35 which coacts with a nose 36 of a clutch pawl 59 arranged in the coupling casing 49.

A connecting rod 38 is pivoted at 37 to the rear end of the lever 21 (Figs. 7, 9 and 12) and the other end of the rod is pivoted to an angle lever 40 at 39. The forward end of the horizontal arm of the angle lever 40 is bent downwards and laterally at 45. A spring 41 (Fig. 9) connected at 42 to the plate 8 and at its other end to the key lever 21, normally tends to turn the latter in the anti-clockwise direction round the screw 19, whereby this lever, by way of the connecting rod 38, acts on the angle lever 40, to turn the latter about the pivot 44 passing through the U-shaped part 43 thereof.

*Coupling mechanism*

Figure 9:
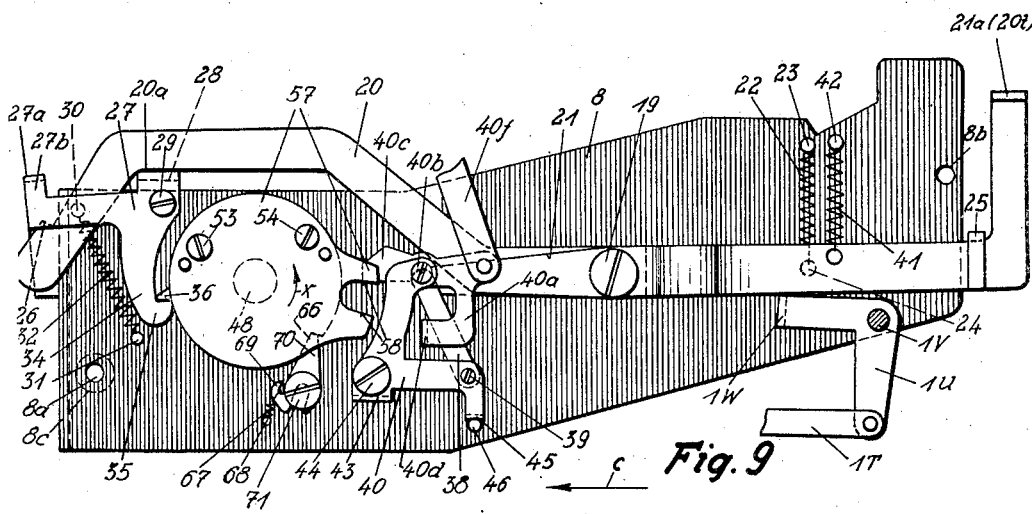
Fig. 9 is a side elevation of the coupling mechanism arranged on the plate, which is fixed to the motor housing, and shown in the rest position, the view being also taken in the direction of arrow A of Fig. 7.

On the main drive shaft 48 is rotatably mounted a coupling casing 49 (Figs. 4, 7, 9, 10, 22 and 25) within which a cam 50 (Fig. 10) is non-rotatably keyed on the shaft 48. The cam 50 is held by a spring disc 51. A cover 57 is fastened at 53 and 54 on a segment-like projection 52 of the coupling casing 49 and this cover 57 is provided with a mouth 58 (Fig. 9). Between the casing 49 and the cover 57 a clutch pawl 59 (Fig. 10) is pivotally mounted at 60 and is acted upon in the direction of the arrow Xa by a spring 63 attached thereto at 61 and connected with the casing 49 at 62. The nose 36, of the clutch pawl 59 is supported on the nose 35 of the clutch-disabling dog 27. On the pawl 59 a tooth 64 (Fig. 10) is formed. In order to hold the shoulder out of engagement with the nose 65 of the pawl 59, the casing 49 has a notch 66 (Figs. 9 and 10) on its periphery in which engages a back-lash preventing pawl 70 normally swung round a pivot 71 (Fig. 9) in the anti-clockwise direction by a spring 67 engaged with a pin 68 on the plate 8 and with the pawl 70. By this means the coupling casing 49 is held in the rest position illustrated in Fig. 9 in which the coupling 65, 64 is opened. Further the coupling casing 49 is provided with a second notch 72, located substantially 180 degrees from the notch 66, with which the back-lash preventing pawl 70 engages when the nose 36 of the clutch pawl 59 is held by the nose 40c (Figs. 9 and 10) of an auxiliary clutch-disabling dog 40a.

If the addition key 21a or the multiplication key 20t (Fig. 1) is depressed the nose 35 (Fig. 10) of the clutch-disabling dog 27 is caused to release the nose 36 of the coupling pawl 59 and the latter, under the action of the spring 63, swings about the pin 60 in the anti-clockwise direction, whereby the tooth 64 enters the path of movement of the nose 65 of the cam 50. After making substantially a half revolution, the nose 65 of the revolving cam 50 catches the tooth 64 of the coupling pawl 59 and the latter being held in engagement with the nose 65 by the spring 63, is turned together with the coupling casing 49 in the direction of arrow x to rotate the main drive shaft 48.

After one-half of a revolution of the main drive shaft 48, in which the coupling casing 49 (Fig. 10) also participates, the nose 40c (Figs. 9 and 12) of the auxiliary clutch-disabling dog 40a which on the depression of the key 21a is moved into the path of movement of the nose 36 of the coupling pawl 59, engages the nose 36 of the coupling pawl 59 whereby the latter is swung about its pivot 60 in the clockwise direction against the action of the spring 63, and the tooth 64 is disengaged from the cam nose 65. While the main drive shaft 48 continues to rotate, the coupling casing 49 comes to a stop.

If the key 21a (Fig. 1) is released the nose 40c (Fig. 9) of the auxiliary clutch-disabling dog 40a releases the nose 36 of the coupling pawl 59 whereby the latter influenced by spring 63 (Fig. 10) is moved to position its tooth 64 in the path of the nose 65 of the cam 50 so that the coupling casing 49 again participates in the further rotation of the shaft 48. When the key 21a is released, the clutch-disabling dog 27 is rocked in the anti-clockwise direction to enter its nose 35 into the path of movement of the nose 36 of the coupling pawl 59.

Shortly before the completion of a revolution of the main drive shaft 48 (Fig. 10), the shoulder 36 of the coupling pawl 59 again encounters the nose 35 and is turned about its pivot 60 to again disengage the tooth 64 from the cam nose 65 whereby the coupling housing comes to rest.

Figures 10, 11, 12:
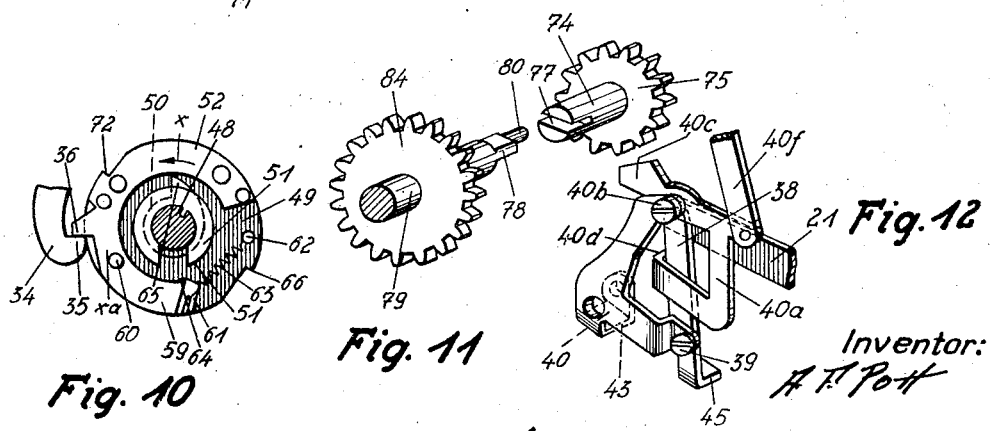
Fig. 10 is a detail side elevation of the drive coupling viewed in the arrow direction A of Fig. 7.
Fig. 11 is a detail perspective of a stub shaft.
Fig. 12 is a detail perspective of parts shown in Fig. 9.

In the normal position of the key lever 21, the right-angled part 45 of the lever 40 abuts against a pin 46 (Fig. 9), fixed to the plate 8. On the vertical arm of the angle lever 40 a pawl 40a is mounted at 40b. The nose 40c of the pawl 40a is capable of co-acting with the shoulder 36, above mentioned, of the pawl 59 arranged in the coupling casing 49. The front end of the pawl 40a is bent downwards and then to the rear (Fig. 12), the rearwardly directed end being provided with a projection 40d (Figs. 7, 9 and 12).

The key board 330 (Figs. 1, 4, 5 and 13) is arranged on the front side of the machine. The key stems 329 carrying the keys 328 are arranged so as to be vertically displaceable in the key board 330. The keys 328 are numbered "0" to "9."

Rearwardly of the key board 330, the casing C enclosing the working parts of the machine, is provided with an inspection aperture P for the setting and indicating wheels 100 the casing, at a point rearwardly of and on a slightly higher plane, having another sight opening for the result register R.

On the left-hand side of the machine a knob 99H is provided for bringing the setting and indicating wheels 100 into their normal position. The knob 266N for setting the machine for addition or subtraction is arranged on the right-hand side of the machine. The platen S is disposed at the rear of the machine.

Keyboard

The frame of the keyboard 330 consists of two side walls 331 and 332 (Figs. 13 and 14) rigidly connected at 333 and 334 to a front plate 335. In the left-hand side wall 331 a slot 336a (Figs. 5 and 20) is provided receiving a projection of the base plate 336 (Figs. 5, 13 and 20) which plate, at its right-hand corners carries depending lugs 337 and 338 (Fig. 13) attached to the right-hand wall 332 at 339 and 340. The base plate 336 forms a guide for the reduced lower ends 341 of the key stems 329.

The cover plate 342 of the key frame 330 (Figs. 4, 5, 12 and 20) is provided on both sides with depending lugs 343 which are attached to the two side walls 331 and 332 at 344. The cover plate 342 forms a guide for the upper reduced ends of the key stems 329. Springs 346 engage the noses 345 (Figs. 13 and 14) formed on the key stems 329 and are connected with rods 347 secured at 348 on the side walls 331 and 332. The key stems 329 are held in their raised normal positions by the spring 346 and their movement is limited by the projections 349 of the key stems 329 striking against the cover plate 342.

The key stems 329 are provided with slots 350, receiving the pins 351 of the slides 352 which latter are movable through the front wall 335 of the frame 330. The slides 352 arranged adjacent the left-hand side framewall 331 are provided at the rear with projections 353 (Fig. 14) directed to the right, and the slides 352 arranged adjacent the right-hand side wall 332 are provided with projections 353 (Figs. 14 and 17) directed towards the left, and the projections of all slides 352 are formed with laterally projecting guide pins 354 (Figs. 5, 13, 14, 17 and 20, in Fig. 14 only two pins 354 are illustrated for the sake of clearness) which are mounted in elongated slots 355 in the side walls 331 and 332. The slides 352 are provided at their rear ends with vertically aligned stops 356 (Figs. 5, 13, 14, 17 and 20) which are adapted to cooperate with the teeth 125 of the setting and indicating wheels 100.

The two side walls 331, 332 of the key frame are offset at their rear ends and the key frame 330 is rigidly mounted by means of suitable screws and nuts 330b (Fig. 4) on the left-hand side wall 1 of the machine. Further the key frame 330 is attached to the machine side wall 1 by means of a screw 330c (Fig. 4) which projects through a distance piece 330d.

On the front wall 335 of the key frame 330 (Figs. 5, 13, 14 and 20) a clearing key stem 359 is mounted on screws 357 and 358 for vertical movement and is provided with a key 360 at its upper end. The lower end of the clearing key stem 359 is formed with a lateral projection 361 terminating in a nose 362 connected by a spring 362 with the front wall 335 at 364 whereby the clearing key stem 359 is held in its normal position.

Figure 4:
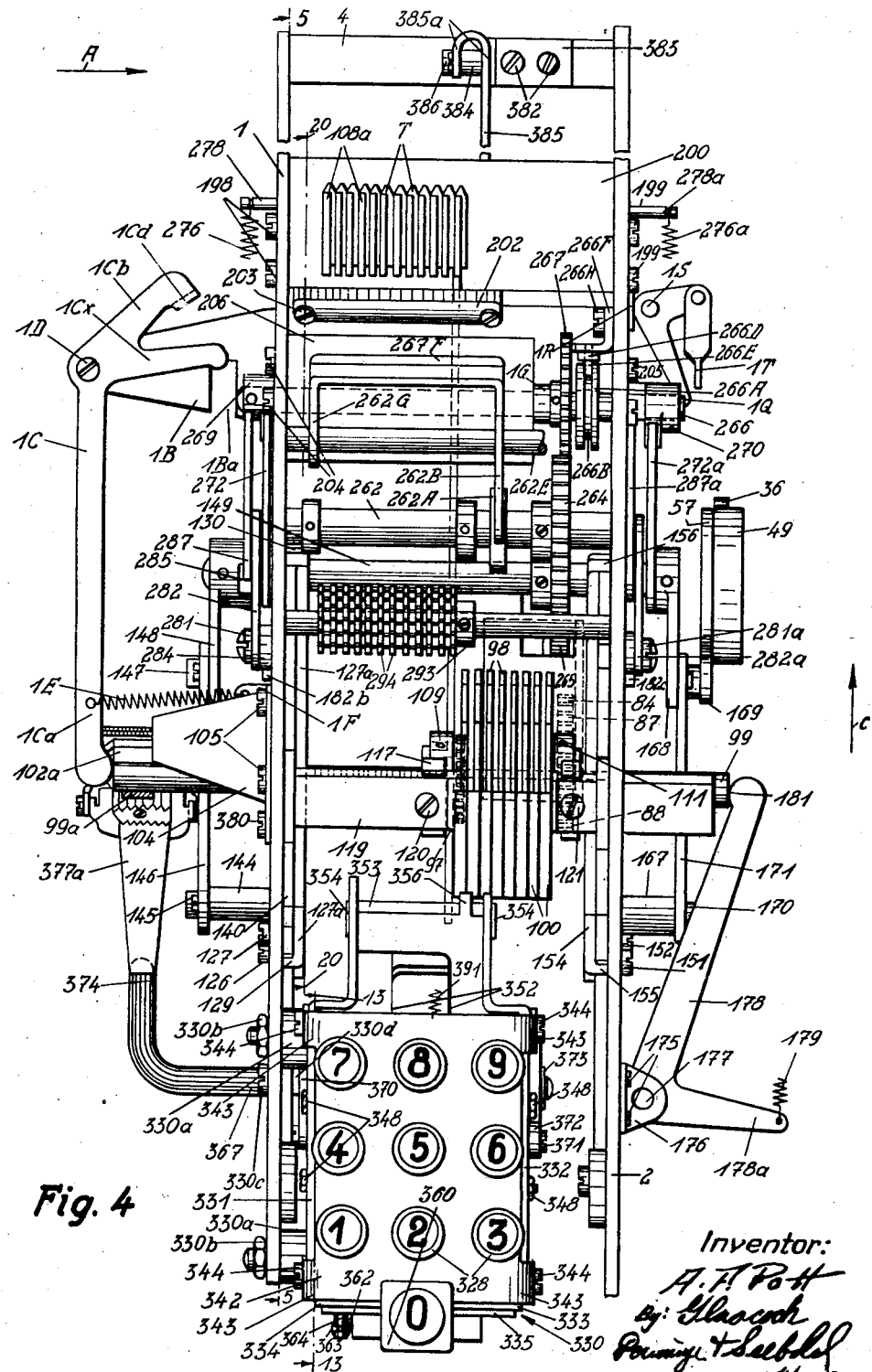
Fig. 4 shows a top plan of the machine in which the cover plates are removed and in which certain mechanisms have been omitted in order to disclose others.

The projection 361 of the key slide 359 is adapted to co-act with the edge 366 (Figs. 5 and 20) of a lever 368 rigidly mounted on the shaft 367, which shaft is journaled at its opposite ends in hangars 370 attached to the left-hand side wall 331 at 369, and 372 attached to the right-hand side wall 332 at 371, the shaft 367 being prevented from axial displacement by spring discs 373 (Figs. 4 and 14).

On the depression of one of the keys 328 (Figs. 13, 14) the corresponding key stem 329 is moved downwards against the action of the spring 346 engaging with it. The upper edge 350a of the slot 350 located in the key lever 329 acts on the pin 361 of the corresponding slide 352, whereby the latter is moved rearwards in the direction of arrow C so that the stop 356 arranged on the slide 352 moves into the path of movement of the tooth 125 of that setting and indicating wheel 100 standing in the working position.

Simultaneously with the depression of one of the keys 328 the lower edge 341a of the associated key stem 329 acts on one of the looped extensions 389, 389a (Fig. 14) or 390, 390a of the underlying lever 385, whereby the driving mechanism is unlocked, as described hereinafter under the heading "Driving mechanism." The part 389a of the lever 385 acts on the edge 368a (Fig. 5) of the lever 368 rigidly mounted on the shaft 367, and swings the lever 368 and the shaft 367 in the clockwise direction, whereby the escapement is actuated, as described under the heading "Escapement."

Figure 3:
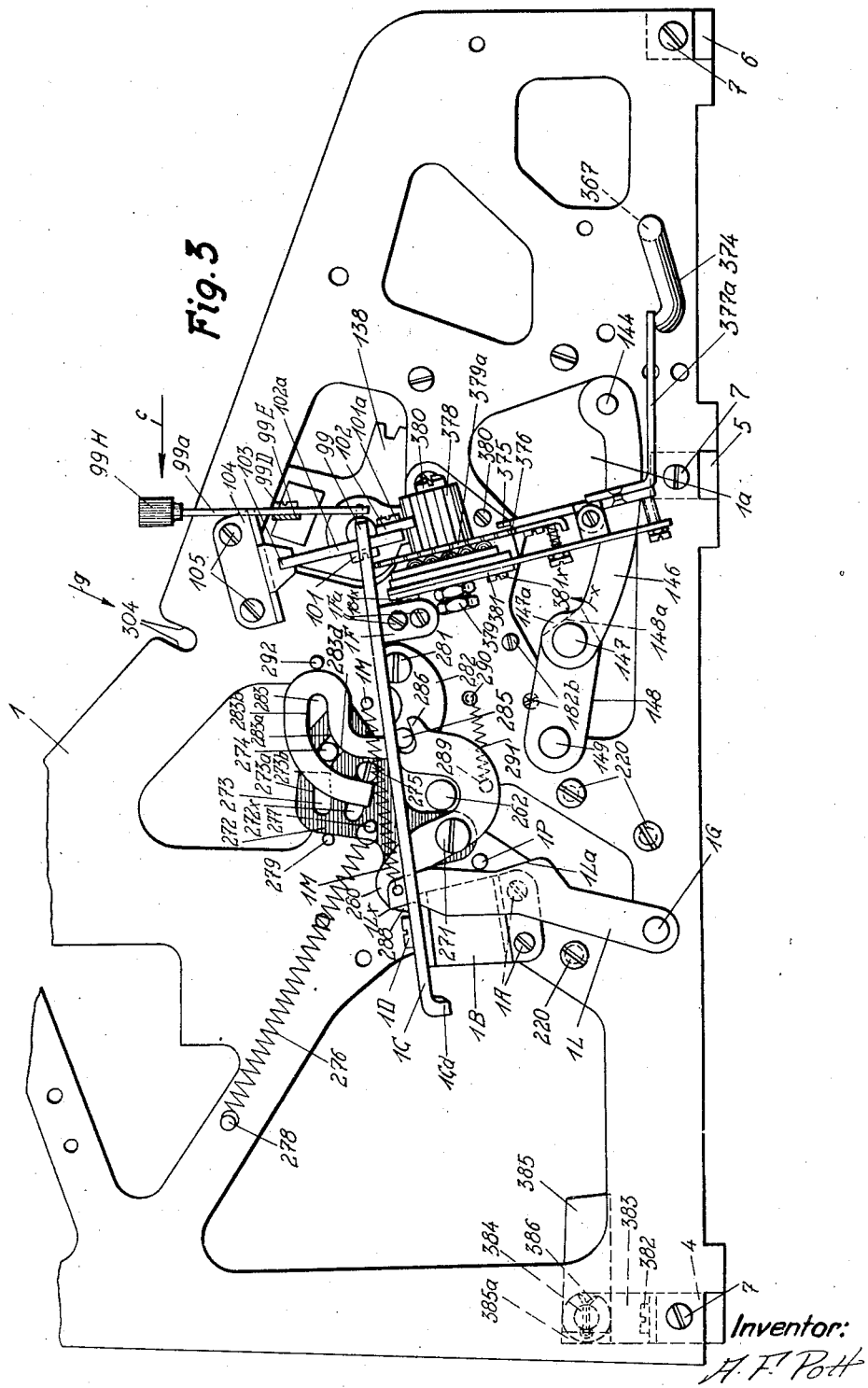
Fig. 3 is a side elevation of the machine with the cover plate removed, in which only the mechanisms are illustrated which are disposed on the outside of the left-hand side wall of the machine, the view being taken in the direction of the arrow A of Fig. 1.

Now, if in the setting of a numerical value a zero in the numerical value is to be set, it is only necessary to depress the zero key 360 whereby the following mechanisms are actuated:

With the depression of the key 360 (Figs. 1, 5, 13, 14 and 20) the key slide 359 is moved downwards against the action of the spring 363, whereby its lower edge acts on the edge 366 (Figs. 5 and 20) of the lever 368 and rocks the latter as well as the shaft 367 in the clockwise direction, whereby the escapement, on release of the key, is operated by way of the parts 374, 377a (Fig. 3). In consequence of this, a movement of the setting and indicating wheels 100 to the left takes place through one step. Since in the depression of the zero key 360 the lever 385 is not operated, and consequently the teeth 393 of the same do not release the toothed wheel 97, then obviously the corresponding setting and indicating wheel 100 cannot be rotated. In the inspection aperture P of the indicating mechanism, there is thus a zero visible in this denomination.

Escapement

The escapement mechanism does not form part of the invention but has been briefly described to afford a better understanding of the parts belonging to the invention. The escapement is mounted at 379 (Fig. 3) on an angled member 381 (Figs. 2 and 3) secured on the left-hand machine side wall 1 at 380.

Since in the present invention a known escapement is applied, this will only be briefly described in the following.

An escapement wheel 379a (Figs. 2 and 3) is rigidly mounted on a shaft (not shown) and a toothed wheel 378 of the escapement rotatably arranged on the same shaft engages a rack 102 rigidly secured to the plate 102a by means of screws 101a, whereby the plate is riveted on the shaft 99. On the escapement wheel 379a, a pawl 379b (Fig. 2) is pivotally mounted at 379c and spring pressed as at 379d. A plate 379e is fixed at 381x to the angled member 381 and supports a fixed dog 375 and a stepping dog 376 mounted on the escapement rocker 377, which is pivoted by a screw 379h to correct its lugs 379m at 379f to lugs 379g of the plate 379e. The part 377a of the plate 377 is operated by the arm 374 on the shaft 367.

Driving mechanism

Figure 8:
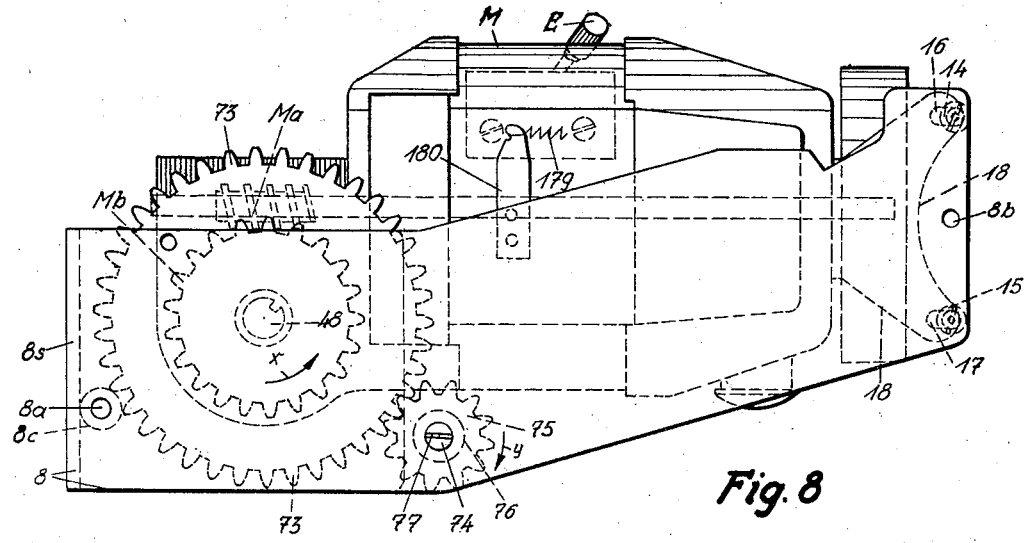
Fig. 8 is a side elevation of the motor and the driving gear arranged on a plate the view being taken in the arrow direction A of Fig. 7.

A worm wheel Mb and worm Ma transmit movement of the motor M (Figs. 7 and 8) to a main drive shaft 48 whereby the latter is rotated in the direction of arrow x indicated in Fig. 8.

On the main drive shaft 48 a toothed wheel 73 (Figs. 7 and 8) is rigidly mounted between the two limbs of the U-shaped plate 8, and is in engagement with a toothed wheel 75 rigidly mounted on the stub shaft 74. By arranging the toothed wheel 75 with its hub 76 (Fig. 7) lying against the plate 8 and on the other side of the plate 8 fixing an adjustable collar on the stub shaft 74, the stub shaft 74 is prevented from falling out of the hole in the plate 8 which is somewhat greater in diameter than the diameter of the stub shaft 74. The free end of the stub shaft 74 is provided with a recess 77 (Figs. 8 and 11) with which the slabbed end 78 of a second stub shaft 79 is capable of engaging, in addition to which a pilot pin 80 formed on the flattened part 78 of the stub shaft 79, is accommodated in a hole, not represented, of the stub shaft 74. This connection of the two stub shafts 74 and 79 is for the purpose of rapidly and conveniently removing and replacing the motor M together with the driving mechanism arranged on it.

The stub shaft 79 is rotatably mounted in the two wings 81 and 82 (Figs. 5, 6 and 20) of a U-shaped bracket 83 secured at 83a (Fig. 5) to a part 182. On the inner side of the wing 82 of the part 83, a toothed wheel 84 is non-rotatably mounted on the stub shaft 79 and on the inner side of the wing 81 of the part 83 an adjustable collar 85 is attached to the stub shaft 79. Since the adjustable collar 85 lies against one wing 81 and the toothed wheel 84 against the other wing 82 of the bracket 83, axial displacement of the shaft section 79 is prevented. The toothed wheel 84 engages a toothed wheel 87 loosely rotatable on the pin 86 of the wing 82, the toothed wheel 87 being also in engagement with a toothed wheel 88, the latter being rotatably mounted on a shaft 89 loosely rotatable in the two wings 81 and 82.

A ring 91 (Fig. 6) is non-rotatably mounted on the shaft 89 but is capable of being axially displaced, while a pin 92 projects through a slot 93 of the ring 91. A ring 94 formed, for example, of vulcanized fibre is pressed against the side 90 of the toothed wheel 88 by the ring 91 and a spring 95 is arranged around the shaft 89, whereby an elastic clutch coupling is obtained. The spring 95 engages at its other end against an adjustable collar 96 rigidly mounted on the shaft 89. On the left-hand end of the shaft 89 a toothed wheel 97 is non-rotatably mounted which latter is adapted to co-act successively with the teeth 98 of setting and indicating wheels 100 (Figs. 4, 15, 17 and 20) rotatably mounted on the shaft 99, as described under the heading "Setting and indicating mechanism."

An angle member 383 is rigidly mounted on the bridge 4 (Figs. 3 and 4) by screws 382. To the upwardly directed limb of the angle member 383 is riveted a pin 384 to which latter the U-shaped end 385a of the above described locking lever 385 for the setting and indicating wheels is pivoted, said lever being held in place by a pin 386. A spring 391 (Fig. 20) connected at 392 to the lever 385 and also to the cover plate 342 of the key frame 330, normally tends to swing the lever 385 in the anti-clockwise direction. The lever 385 is provided with two teeth 393 (Figs. 5 and 20) engageable in the tooth spaces of the power driven toothed wheel 97 whereby the latter, when the motor is running, is held locked until a key 328 is depressed.

When the motor M is set in operation by adjustment of a handle E, the main drive shaft 48 and the toothed wheel 73 are rotated in the direction x (Fig. 8) by way of the worm wheel Mb and the worm Ma. The toothed wheel 75 (Figs. 7 and 8) engaging with the toothed wheel 73 and the stub shaft 74 are rotated in the direction y. Since the stub shaft 79 is in driving connection with the stub shaft 74, the stub shaft 79 and the toothed wheel 84 (Figs. 5, 6 and 20) are rotated in the direction y. The toothed wheels 87 and 90 are rotated in the directions indicated in Fig. 6. The surface 90 of the toothed wheel 88 slips on the ring 94 and the toothed wheel 97 as well as the parts 89, 91, 92, 93, 95, are held stationary during engagement of the teeth 393 of the lever 385 with the wheel 97.

Figure 5:
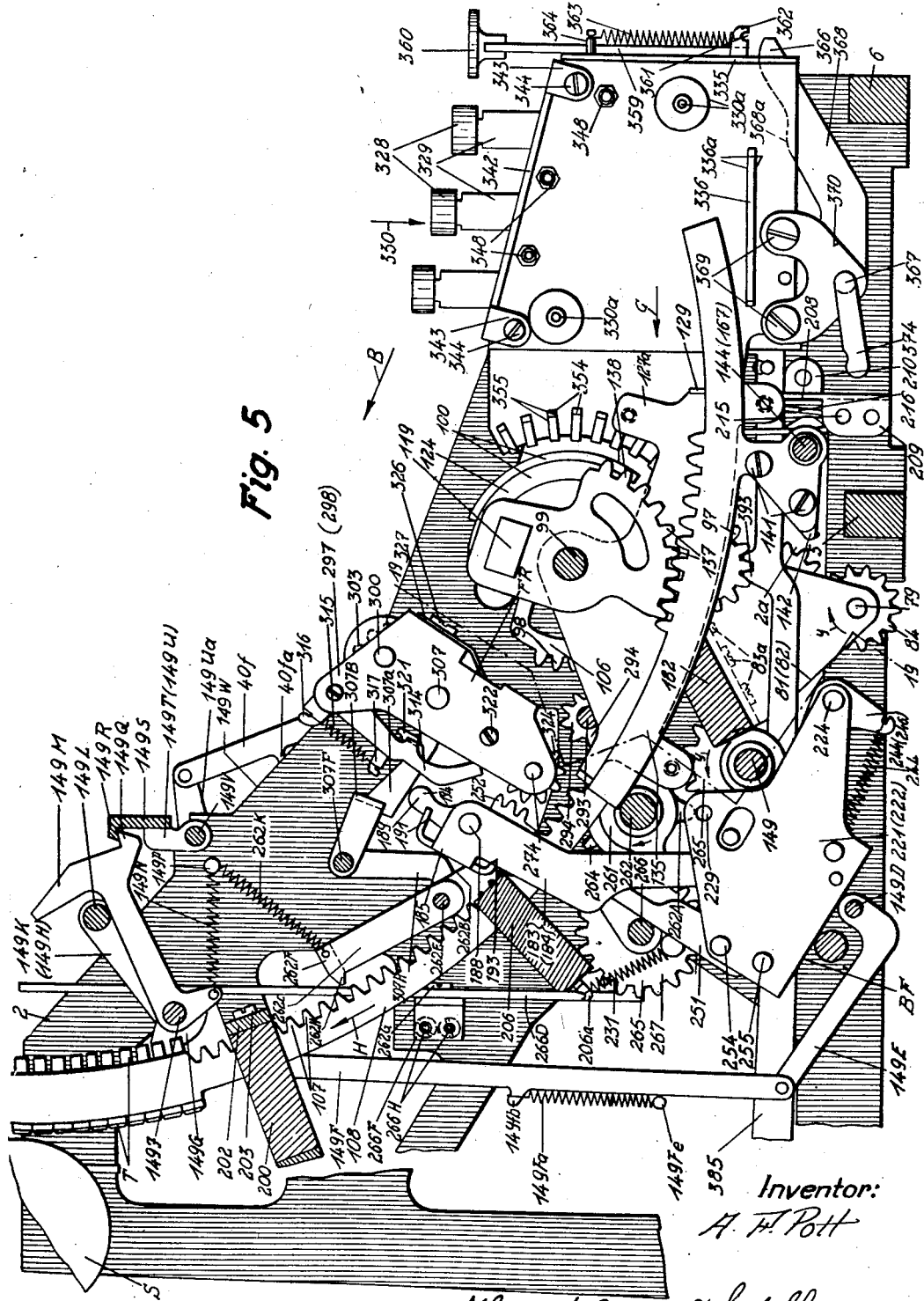
Fig. 5 is a section according to the section line 5—5 of Fig. 4 and viewed in the direction of the arrow A in which view the mechanisms are shown in the rest position.
Figure 6:
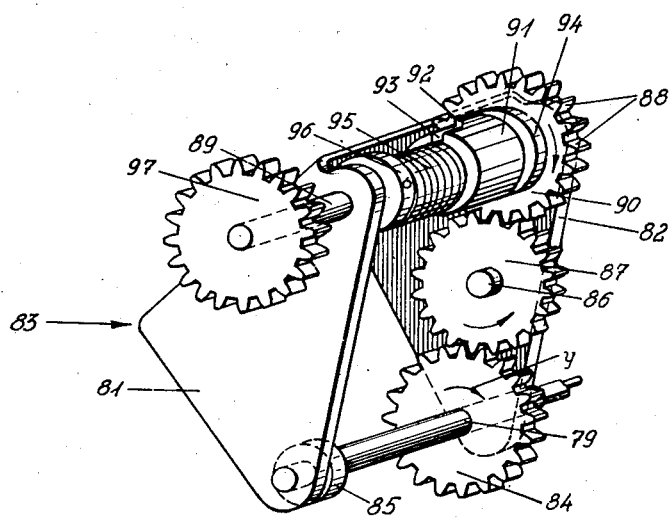
Fig. 6 is a perspective taken from the left-hand front of the machine of the friction clutch coupling.

When, however, a key 328 (Figs. 5 and 13) is depressed, the lever 385 is swung in the clockwise direction about its pivot 384 and the teeth 393 of said lever disengage the toothed wheel 97 so that the latter in consequence of the force exerted by the spring 95 (Fig. 6) can participate in the rotation of the toothed wheel 88 in the direction indicated in Fig. 6 through the friction clutch ring 94.

*Setting and indicating mechanism*

On the shaft 99 (Figs. 4, 5, 15, 17 and 20) are arranged for example, eight setting and indicating wheels 100, the front portions, of which are flanged and provided with number "0" to "9," which are visible through the inspection aperture P (Fig. 1) of the cover plate C, and indicate to the operator of the machine the numerical values which have been set up.

The opposed rear portions 106 of the wheels 100 are provided with the teeth 98, which are adapted to come in engagement with teeth 107 of actuator sectors 108 by the step-wise left hand movement of the wheels 100. The teeth 98 of the setting and indicating wheels 100 of the highest decimal order are normally in engagement with the driving wheel 97. To the left of the eight setting and indicating wheels 100 a forked hanger 109 (Figs. 15 and 20) is rigidly mounted on the shaft 99 at 110 (Fig. 15) and on the right-hand side of the wheels 100 is likewise arranged a forked part 111 rigidly mounted on the shaft 99 at 112 (Fig. 15). In the lower forked-shaped ends of the parts 109 and 111 (Fig. 20) a setting wheel restoring beam 114 is fixed at 113 (Figs. 15, 17 and 20) and is formed of vulcanized fibre, the beam projecting through the openings 115 of the setting and indicating wheels 100.

The beam 114 is provided with eight equidistant grooves 116 (Fig. 15) in which the inner peripheries of the toothed arcs 106 of the wheels 100 are slidably guided.

A beam 119 is secured at 120 and 121 in the outer forked ends of arms 117, 118 journaled on the shaft 99 near its opposite ends whereby the parts 117, 119, 118, form a rigid structure. The beam 119 is provided with transversely extending grooves 123 (Figs. 15 and 17) in which the inner peripheries 124 of the wheels 100 are guided. Each setting and indicating wheel 100 is provided with a stop tooth 125.

A guide member 127a (Fig. 15) is rigidly secured at 126, 127 and 128 to the left-hand wall 1 and a toothed clearing 135 is guided by the edges 128a of lugs 129 and 130 extending over the upper edge of the clearing sector and at its lower edge by the surfaces 133 of guide lugs 132 and 134 forming part of the guide member 127a through which the shaft 99 passes. The teeth 136 of the toothed sector 135 are in engagement with the teeth 137 of a toothed segment 138 rotatably mounted on the shaft 99 and provided with a rectangular opening 139 receiving the beam 119. The toothed segment 138 is arranged between the left-hand side wall 1 and the guide member 127a and is thereby held against axial displacement on the shaft 99.

The toothed sector 135 is provided with a depending projection 140 (Figs. 5 and 15) to which a triangular member 142 formed of vulcanized fibre is secured at 141, the member 142 being adapted to cooperate with noses 143 (Fig. 20) arranged on actuator sectors 108.

A pin 144 is rigidly mounted on the projection 140 of the toothed sector 135, and projects through an aperture 1a (Fig. 3) in the left-hand side wall 1 and at its free end is reduced at 145 and pivoted to a link 146, which latter is pivoted at its other end to a pin 147 of a crank 148. The crank 148 is rigidly mounted on a shaft 149 which is mounted in bearings in the two side walls 1 and 2 of the machine.

On the right-hand side wall 2 a guide member 154 (Figs. 4 and 15) similar to the guide plate 127a, accommodates the shaft 99 and is rigidly mounted at 151, 152 and 153. A toothed sector 161 is guided by lugs 155 and 156 extending over its concave upper edge and by lugs 159 and 160 contacting its convex lower edge. The teeth 162 of the toothed sector 161 are in engagement with the teeth 163 of a toothed segment 164.

The toothed segment 164 is provided with a rectangular opening 165 through which the beam 119 passes. The toothed segment 164 is confined between the right-hand side wall 2 and the guide member 154.

The toothed sector 161 (Fig. 15) is provided with a depending projection 166, carrying a pin 167 passing through an opening 2a (Fig. 5) located in the right-hand side wall 2 and which is reduced at its free end. On the shaft 149 is rigidly mounted a crank 168 carrying a pin 169 (Fig. 4) connected by a link 171 with the reduced part 170 of the pin 167.

A bracket member 176 is secured to the outer side of the wall 2 at 175 on which an angle lever 178 is pivotally mounted at 177. This lever 178 is acted on in the anti-clockwise direction by a spring 179 (Figs. 4, 8 and 15) secured to the arm 178a of the angle lever 178, and to a part 180 (Fig. 8) on the plate 8. In this arrangement the free end 181 (Figs. 4 and 15) of the rearwardly directed arm of the angle lever 178 is positioned against the shaft 99, and is capable of displacing said shaft to the left.

The plate 102a (Fig. 2) carrying the rack 102 mentioned under "Escapement" is arranged with its top edge engaged in a recess 103 of a guide member 104 secured at 105 on the outer side of the left hand wall 1 of the machine, whereby rotation of the shaft 99 is prevented, but axial displacement of the same is possible.

The value to be registered in the totalizer is set up by depression of the corresponding keys 328 (Figs. 1, 13 and 14) on the setting and indicating wheel 100, whereby the following mechanisms are operated:

On the depression of one of the keys 328 (Figs. 13, 14) the nose 356 of the corresponding slide 352 is moved into the path of movement of the stop tooth 125 of the setting and indicating wheel 100 standing in operative position in the manner as described under the heading "Keyboard."

Depression of said key 328 disengages the teeth 393 of the locking lever 385 from the teeth of the wheel 97, thereby releasing the wheel 97 for rotation by the toothed motor driven wheel 88. Initially, the extreme left-hand setting and indicating wheel 100 of the setting wheel carriage constituted by the parts 99, 100, 114 and 119, in the extreme right-hand position of said carriage (seen in Fig. 4), is located with its teeth 98 (Figs. 5 and 20) in engagement with the teeth of the toothed master wheel 97. The setting and indicating wheel 100 is turned about the shaft 99 in the anticlockwise direction until the stop tooth 125 thereof strikes the nose 356 of the slide 352 corresponding to the depressed key 328, of the value "1" to "8," whereby the rotary movement of the setting and indicating wheel 100 as well as the toothed master wheel 97 is arrested, the slip of the ring 94 permitting the toothed wheel 88 to continue rotation.

When depressing the key 328 corresponding to the value "9," the rotary movement of the setting and indicating wheels 100 is properly limited by engagement of the edges 100a (Fig. 15) thereof with the bar 119.

As soon as the setting and indicating wheel 100 has come to rest, the value corresponding to the depressed key 328 (Fig. 13) is visible in the inspection aperture P (Fig. 1) of the indicating mechanism.

Upon the depression of one of the keys 328 (Fig. 13) the corresponding key stem 329, as already described, acts on the locking lever 385 and the offset 389a (Fig. 13) of the latter acts on the edge 368a (Fig. 5) of the lever 368 rigidly mounted on the shaft 367, and swings the latter as well as the shaft 367 in the clockwise direction. The angular end 374 of the shaft 367a is thus rocked upwardly against the forwardly projecting tail 377a of the escapement rocker 377 (Fig. 2) and actuates the escapement 375, 376 whereby on the release of the depressed key 328 the setting wheel carriage parts 99, 100, 114 and 119 are moved one step to the left, by the bell crank lever 178 (Fig. 4) under the pull of the spring 179. The extreme left-hand setting and indicating wheel 100 is thus moved out of engagement with the master wheel 97 and into engagement with the teeth 107 of the right-hand actuator sector 108 whilst the second setting and indicating wheel 100 moves into engagement with the driving wheel 97 as described under the heading "Driving mechanism."

By repetition of operations of the keys 328, further values may be set up in the succeeding setting and indicating wheels 100 and in so doing the above described operations are repeated.

When the wheels 100 and parts 114 and 119 are in the extreme right hand position as shown in Fig. 4, the teeth 98 of the left hand wheel 100 are in engagement with the toothed master wheel 97 while the remaining wheels 100 disposed to the right of the engaged wheel are prevented from unintentional rotation by a locking and aligning bar 182 provided with a long tooth (Fig. 20) which projects into the spaces of the teeth 98. At the point lying opposite to the toothed master wheel 97 a space is provided in the toothed aligning bar 182 to permit free rotation of the setting and indicating wheel 100 which is disposed in setting position. Further, the toothed aligning bar 182 is provided with additional spaces receiving and guiding the sectors 108 (Fig. 20). The portions of the tooth of the bar intermediate the spaces accommodating the sectors 108 serve to prevent the wheels 100 as they pass from one position to the next from being moved out of the proper adjustment. The toothed aligning bar 182 is rigidly mounted between the two side walls 1 and 2 at 182b and 182c (Fig. 4).

The toothed sectors 135 and 161 (Figs. 5 and 15) are moved in the direction of arrow C (Figs. 5 and 15) through the links 146 and 171 on the further rotation of the cranks 148 and 168 (Fig. 15) in the arrow direction x. Since the member 142 (Figs. 5, 15 and 20) is attached to the toothed sector 135 it also moves in the direction C away from the noses 143 (Fig. 20) of the actuator sectors 108 thereby permitting movement of said sectors 108. In this operation the toothed segments 138 and 164 which are in engagement with the toothed sectors 135 and 161, are swung about the shaft 99 in the clockwise direction and the beam 119 also participates in this swinging movement. The beam 119 acts successively on the edges 100a (Figs. 15 and 17) of the setting and indicating wheels 100 and swings the latter counterclockwise back to their starting positions to an extent dependent on the previous setting thereof.

During rotation of the main drive shaft 48 in arrow direction x (Fig. 9) the shaft 149 is rotated through the intermediary of the parts 57 (Fig. 9) 169 and 168 (Fig. 4) in the same direction. Consequently, the toothed sectors 135 and 161 during the second half of the revolution of the cranks 148 and 168 (Figs. 5 and 15) are moved by the links 146 and 171 in the direction opposite the arrow C (Figs. 5 and 15), whereby the toothed segments 138 and 164 are turned on the shaft 99 in the anti-clockwise direction, the beam 119 being returned to the normal position represented in Fig. 5.

*Automatic zeroizing mechanism for the setting and indicating mechanism*

A bracket 1B (Figs. 3, 4, 22, 23 and 25) is secured at 1A on the outer face of the left hand side wall 1 of the machine and a three armed lever 1C is pivoted thereon at 1D. Under the action of a spring 1E connected with the machine frame at 1F and with the forwardly directed arm 1Ca of the lever 1C, the latter is normally urged in the anti-clockwise direction about the pivot 1D, whereby the arm 1Ca is held in contact with the axially shiftable shaft 99. The spring 1E is of less tension than the spring 179 (Figs. 4 and 15). The arm 1Cd of the three armed lever has a movement limiting projection 1Cb engageable with the bracket 1B. The arm 1Cx of the three-armed lever 1C is adapted to cooperate with the lever 1L (Fig. 3).

In the side walls 1 and 2 of the machine a shaft 1G (Figs. 3, 22, 23 and 25) is axially displaceable and rockably arranged. The shaft 1G is influenced in the direction of the arrow A (Figs. 22, 23 and 25) by a spring 1H engaging a collar 1J thereon whereby in the normal position a second adjusting ring 1K (Fig. 22) is caused to bear against the inner side of the right hand side wall 2 of the machine. On the left-hand end of the shaft 1G, which projects through the side wall 1 of the machine the lever 1L (Figs. 3, 4, 22, 23 and 25) is rigidly secured. The projection 1La (Fig. 3) of the lever 1L is adapted to cooperate with the projection 148A of the crank 148. By means of a spring 1M, connected at LN to the machine wall and to the lever 1L, the latter is influenced in the clockwise direction round the shaft 1G and its normal position is determined by a stop pin 1P (Fig. 3).

The right hand end of the shaft 1G, which projects through the side wall 2 of the machine coacts with the forward end of an angle lever 1Q (Figs. 4, 22, 23 and 25) which is pivoted at 1S on the bracket 1R. To the other arm 1Qa of the angle lever 1Q a connecting rod 1T is pivotally connected. The forward end of the connecting rod 1T (Figs. 4, 9 and 22) is pivotally connected to an angle lever 1U (Figs. 9 and 22) which is rockably mounted on a shaft 1V, which latter (Figs. 7, 9 and 22) is rigidly secured to the side wall 2 of the machine and to the frame 8. The normal position of the parts 1Q, 1T, 1U is determined on the one hand by engagement of the angle lever 1Q against the shaft 1G and on the other hand by engagement of the projection 1W of the angle lever 1U against the under side of the lever 21.

During the movement of the shaft 99 and of the indicating and adjusting wheels 100 to the left (seen in Fig. 4) the shaft 99 acts upon the arm 1Ca (Figs. 4, 22, 23 and 25) of the three armed lever 1C, whereby the latter is rocked in the clockwise direction round the pivot 1D against the action of the spring 1E. Thus the arm 1Cx of the three armed lever 1C is brought into the path of lateral movement of the lever IL. Since the key lever 21 has not yet been depressed for an addition operation, the lever IL is held in its normal position (shown in Figs. 4 and 22) by the spring IH acting on the shaft IG. In this position the lever IL is not capable of co-acting with the arm ICx of the three-armed lever IC.

However, on depression of the key 21a (Figs. 1 and 4) the key lever 21 is rocked about the pivot 19 in the clockwise direction, and acts upon the projection IW (Fig. 9) of the angle lever IU, which latter is rocked in the anti-clockwise direction about the pivot IV. Consequently the connecting rod IT is moved in the direction opposite the arrow C (Fig. 9), whereby the angle lever IQ (Figs. 4, 22, 23, and 25) is rocked in the clockwise direction, so that the shaft IG is moved to the left against the action of the spring IH. Thus the lever IL is moved laterally into the path of the lever 148 and ICx.

After one-half of a revolution of the main drive shaft 48 the projection 148A (Fig. 3) of the crank 148 acts upon the projection ILa of the lever IL, whereby the same is rocked round the shaft IG against the action of the spring IM in the anti-clockwise direction. The lever IL acts with its surface ILx (Fig. 3) upon the arm ICx (Figs. 4 and 22) of the three-armed lever IC, whereby the latter is rocked in the anti-clockwise direction and consequently the arm ICa of the three-armed lever IC acts upon the shaft 99, so that the latter and the indicating and adjusting wheels 100 are moved to the right into their normal positions.

When the key lever 21 is released, and rocks in the anti-clockwise direction, the lever IU (Figs. 7, 9 and 22) is rocked about the pivot IV in the clockwise direction, the connecting bar IT is moved in the direction of the arrow C, the angle-lever IQ (Figs. 4, 7, 9, 22, 23 and 25) is rocked in the anti-clockwise direction and the shaft IG is moved to the right under the action of the spring IH. Thus the lever IL is moved laterally out of the path of movement of the crank lever 148 and of the arm ICx of the three armed lever IC.

*Hand operated means for zeroizing the setting and indicating mechanism by hand*

At the left end of the shaft 99 a lever 99A (Figs. 3, 4 and 16) is connected therewith by a pin and slot-connection 99B, 99C. The lever 99A is pivotally mounted at 99D on an angle piece 99E which latter is secured at 99G to a side wall 99F of the machine. The upper end of the lever 99A is provided with a knob 99H (Figs. 1, 3 and 16) and projects through a slot 99J of a cover plate C, the slot, at one end being marked with the word "Cancelled" and at the opposite end with the words "Not cancelled." The purpose of the marking is described later.

Upon movement of the setting and indicating wheels 100 to the left, the lever 99A (Fig. 16) is rocked about the pivot 99D in the clockwise direction in consequence of the pin and slot connection 99B, 99C.

In order to bring the setting and indicating wheels 100 back to their rest positions as, for instance, after an operation involving multiplication is finished, it is necessary to rock the lever 99A (Fig. 16) in the anti-clockwise direction to a position opposite the mark "cancelled" whereby in consequence of the pin and slot connection 99C and 99B, the shaft 99 and the setting and indicating wheels 100 are moved to their rest positions.

*Actuator mechanism*

A guide member 200 (Figs. 4, 5, 17 and 20) is rigidly secured at 198 and 199 to the opposed machine walls 1 and 2 and is provided with comb slots 201 (Fig. 17) in which the actuator sectors 108 are accommodated. A bar 202 is arranged over the slots 201 and is secured in place at 203.

Further a guide member 206 (Figs. 4, 5, 17 and 20) is secured at 204 and 205 in the machine and is provided with slots 207 (Fig. 17) in which the actuator sectors 108 are guided.

On the upwardly directed terminals 108a of the actuator sectors 108, movable type members T are arranged in any suitable manner and are caused to strike against a writing sheet arranged on the platen S.

A bridge member 208 (Figs. 5, 5a and 20) is attached at its right end to the machine wall 2 at 211 and 213 (Fig. 20) by oppositely bent lugs 212 and 214 and the left end of the member 208 is similarly secured to the left wall 1 by corresponding lugs 209 and 210.

A shaft 215 is mounted in the lugs 209 and 212 and supports torsion springs 216, one end of each of which rests against the end of its appropriate slot of a series of slots 218 (Fig. 5a) located in the angular part 217, while the other ends of the springs rest against a bar 219 which is fixed to the teeth, formed by the slots 218. The torsion springs 216 in the rest positions of the actuator sectors 108 bear against the noses 143 thereof (Fig. 20) and hold the sectors 108 fast in their rest positions against the actuator-restraining member 142, so that unintentional movement of these sectors 108 is prevented. Between the individual torsion springs 216 there are spacing members 215a (Fig. 5a), the distance piece 215a lying next to the extreme right-hand torsion spring 216 being formed correspondingly longer.

The mouth 58 (Fig. 9) of the cover 57 for the coupling casing 49 (Fig. 4) embraces the pin 169 mounted on the lever 168 and therefore the shaft 149 and the levers 168 and 148 (Figs. 3, 4, 15, 22, 23 and 25) are turned as a unit by the casing 49 in the direction of arrow x. The wheels 324 of the totalizer are brought in engagement with the teeth of the actuator sectors 108 as hereinafter described under the heading "Totalizer engaging and disengaging."

The toothed sectors 135 and 161 actuated during the first half revolution of the shaft 149, draw the restraining member 142 rearwardly, thereby releasing the noses 143 of the actuator sectors 108 and the setting and indicating wheels 100 are swung in the clockwise direction as described under the heading "Setting and indicating mechanism" in consequence of the action of the resetting beam 119. The actuator sectors 108 standing in engagement with the setting and indicating wheels 100, are thereby moved in the direction of arrow H (Figs. 5 and 20).

Figure 5A:
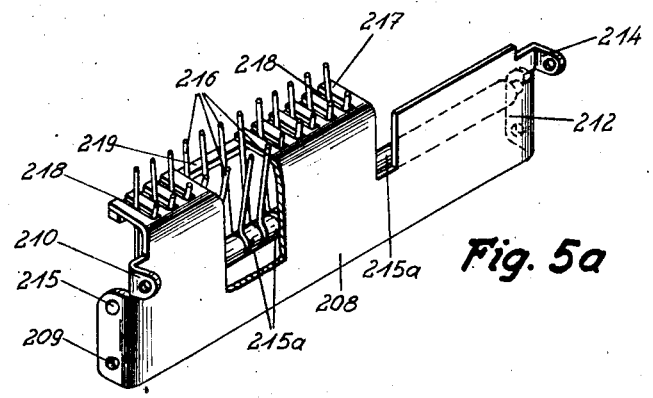
Fig. 5a is a detail perspective of Fig. 5, taken from the left-hand front of the machine.

As soon as the resetting beam 119 (Figs. 5, 15, and 20) has returned the setting and indicating wheels 100 into their rest positions illustrated in Fig. 5, the actuator sectors 108 have been moved so far in the arrow direction H that the type members T, mounted on the actuator sectors 108, corresponding to the value brought into the setting and indicating wheels 100 have moved into the printing position.

In the second half of the revolution of the main drive shaft 48 in the arrow direction x (Fig. 9), the toothed sectors 135 and 161 are returned, as described under the heading "Setting and indicating mechanism" into the normal position represented in Fig. 5, and during the movement of the restraining member 142 the noses 143 are engaged and the actuator sectors 108 are thereby returned to the rest positions.

*Aligning mechanism for the actuator mechanism*

A cam 262A is rigid on the shaft 262 (Figs. 4, 5, 20 and 23) and is adapted to co-act with the bail lever 262B, pivotally mounted on the rod 262E, fixed in the side walls 1 and 2 of the machine. By means of a bridge 262F the bail lever 262B is connected with the lever 262G which is likewise rockably arranged on the rod 262E. The bridge 262F of the bail constituted by parts 262G, 262F, 262B is adapted for engagement at its toothed part 262H with the actuator sectors 108, whereby the latter are aligned in their operative positions. A spring 262K is connected with the machine wall at 149P and with the bridge 262F.

During the typing of the value upon the platen S (Figs. 5 and 20) the cam 262A acts with its elevated part upon the nose 262Ba (Fig. 20) of the lever 262B, whereby the bail 262B, 262F, 262G is rocked in the anti-clockwise direction round the shaft 62E against the action of the spring 262K, so that the tooth 262H of the bail 262B, 262F, 262G comes in engagement with the teeth of the actuator sectors 108 and aligns the latter for the printing operation.

The mouth 58 (Fig. 9) of the cover plate 57 fixed to the coupling casing 49 (Fig. 4) embraces the pin 169 mounted on the arm 168 rigidly mounted on the shaft 149 and consequently the shaft 149 and the toothed wheel 265 secured thereto are rotated by the cover 57 in the direction of the arrow x (Fig. 20). The toothed wheel 264 rigidly mounted on the shaft 262 meshes with the wheel 265 and therefore the shaft 262 is also rotated.

After the printing is effected the nose 262Ba of the lever 262B disengages the elevated part of the cam 262A whereby the bail 262B, 262F, 262G is rocked about the shaft 262E under the action of the spring 262K in the clockwise direction, and the part 262H of the bridge 262F disengages and unlocks the teeth 107 of the actuator sectors 108.

*Printing mechanism*

On the shaft 149 a cam 149A (Figs. 20 and 25) is arranged, which is engageable with a roller 149B, rotatably arranged on a lever 149C, the latter being rigidly mounted on a shaft 149D journaled in the two side walls 1 and 2 of the machine. A crank arm 149E (Figs. 5, 20 and 25) is rigidly secured to the shaft 149D and the end thereof is pivotally connected with a link 149F, which latter is pivotally connected at its upper end to the rearwardly directed arm 149G of the lever 149H. The levers 149H and 149K are loosely mounted on the rod 149J, fixed to the two side walls 1 and 2 and are connected with one another by a bar 149L. Between the two levers 149K and 149H, hammers 149M (Figs. 5, 20 and 25) are pivotally mounted on the rod 149J. Spacing washers 149Ma (Fig. 25) are arranged between the hammers 149M. By means of springs 149N connected with the machine wall at 149P and with the hammers 149M, the latter are influenced in the anticlockwise direction round the rod 149J. In the normal position of the hammers the projections 149Q (Figs. 5, 20 and 25) engage against the projection 149R of a bail constituted by the parts 149T, 149S, 149U. Said bail is pivoted by its arms 149T and 149U round the rod 149V, rigidly mounted in the side walls 1 and 2. On the right-hand end of the rod 149V, a lever 149Ua is rigidly secured which is pivoted to a link 40f, the latter being connected at its other end with the pawl 40a (Figs. 9 and 12). The bail 149T, 149S, 149U, the lever 149Ua and the link 40f are held in operative position by a spring 149W. A spring 149Fa (Figs. 5 and 20) is connected at 149Fe to the machine wall and to the link 149F whereby the bail 149K, 149L, 149H and the parts 149F, 149E, and 149C are held in the normal position with the roller 149B in contact with the cam 149A.

During the turning of the shaft 149 in the direction of the arrow x (Figs. 5 and 20) the roller 149B of the crank arm 149C is engaged by the nose of the cam 149A, whereby the crank arm 149C and the shaft 149D are rocked in the anti-clockwise direction. Thus the crank arm 149E is also rocked under the action of the spring 149Fa, whereby the link 149F is moved downwardly (Figs. 5 and 20). Consequently the bail 149K, 149L, 149H is rocked about the rod 149J in the anti-clockwise direction to the position shown in Fig. 20 in dotted lines, so that the type hammers 149M are released.

When, during the operation of the machine, the nose 36 (Figs. 9 and 12) of the coupling pawl 59 acts upon the nose 40c of the auxiliary clutch-disabling dog 40a, the latter is rocked in the clockwise direction about the pivot 40b, whereby the link 40f is moved downwardly against the action of the spring 149W (Fig. 20) and the bail 149T, 149S, 149U is rocked in the clockwise direction round the rod 149V. The locking flange 149R of the locking bail 149T, 149S, 149U releases the projections 149Q of the hammers 149M, so that the latter may swing in the anti-clockwise direction about the rod 149J under the action of the springs 149N. Consequently the hammers 149M strike the printing types T, and the value, which is set up in the machine is typed upon the sheet on platen S. After the printing, the hammers 149M fall back into the position shown in Fig. 20 in dotted lines, in which position they are held by the springs 149N.

As soon as the projection 40c (Figs. 9 and 12) of the auxiliary clutch-disabling dog 40a releases the projection 36 of the pawl 59 of the coupling housing 49, the auxiliary clutch-disabling dog 40a is rocked in the anti-clockwise direction round the screw 40b under the tension of the spring 149W acting on the link 40f so that the parts 149T, 149S, 149U are rocked in the anti-clockwise direction about the rod 149V to the position, shown in Figs. 5 and 20. In this position the projection 149R of the bail 149T, 149S, 149U is disposed in the moving path of the projection 149Q of the hammers 149M. After a half of a revolution of the shaft 149, the roller 149B of the lever 149C is operated by the cam 149A, whereby the lever 149C—149E is rocked, lifting the link 149F and restoring the bail 149K, 149L, 149H to full line position (Fig. 20). The bail bar 149L acts upon the hammers 149M, so that the projections 149Q thereof act upon the locking flange 149R of the bail 149T, 149S, 149U and rock the same in the clockwise direction about the rod 149V against the action of the spring 149W. The rocking thus transmitted to the auxiliary clutch-disabling dog 40a by the link 40f does not influence the machine.

The locking flange 149R of the bail 149T, 149S, 149U snaps behind the projections 149Q under the action of the spring 149W and the hammers 149M are locked in their rest positions.

Totalizer mechanism

Figure 19:
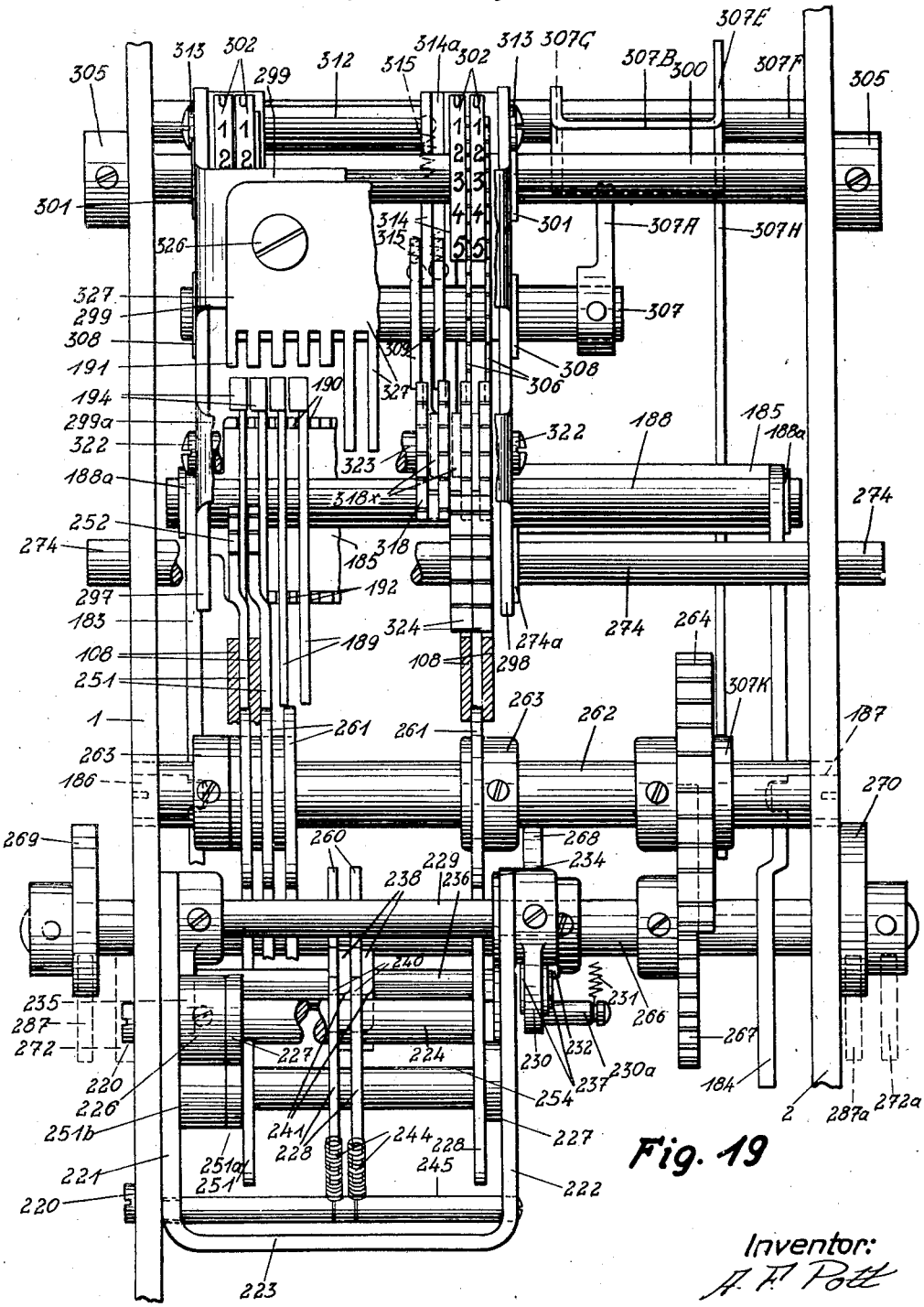
Fig. 19 is a vertical section of the totalizer mechanism and tens transfer mechanism viewed from the front in the direction of arrow B of Fig. 5 and taken on the section line 19—19.
Figure 22:
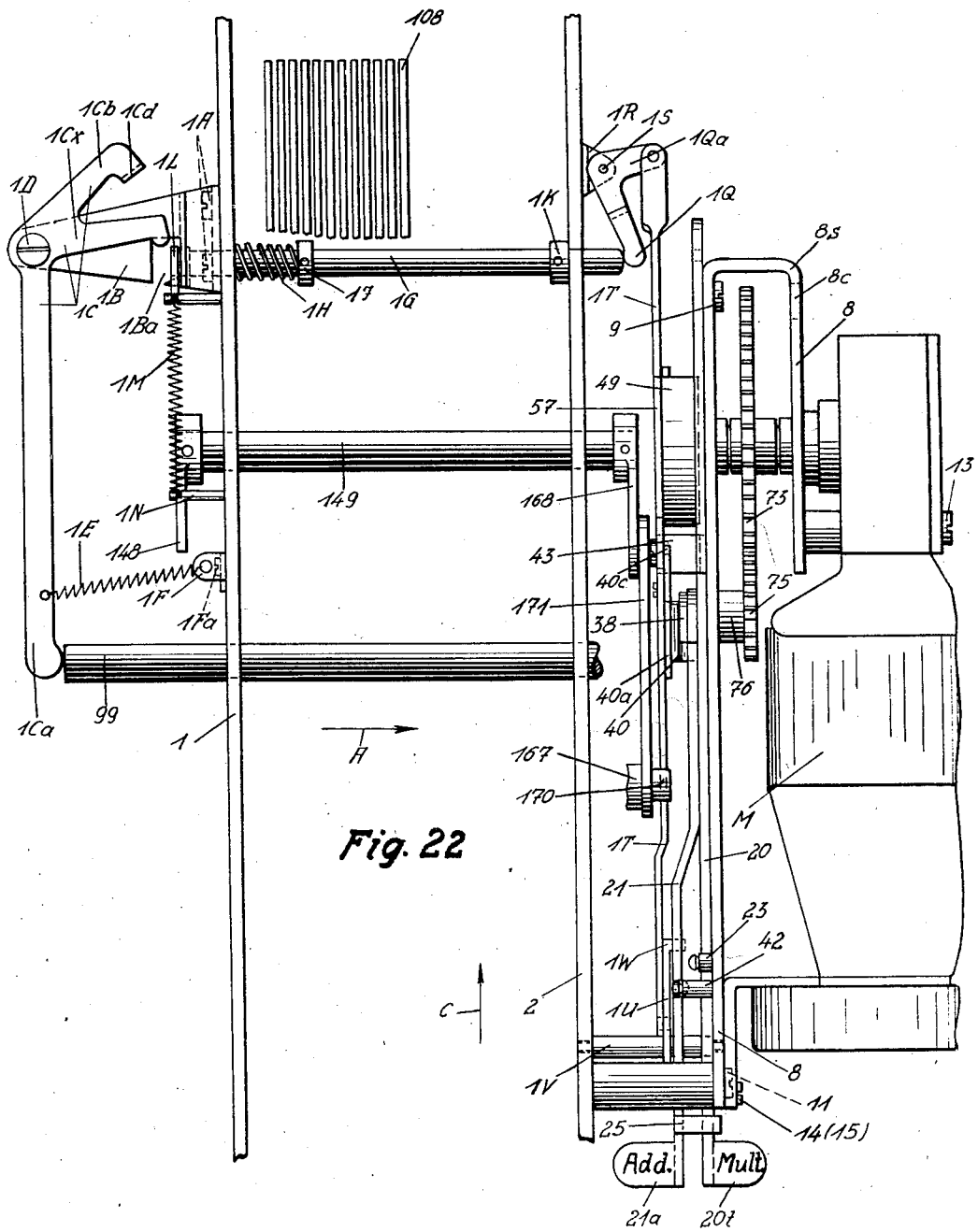
Fig. 22 is a fragmentary plan of the zeroizing mechanism for the setting and indicating wheels.
Figures 23, 24:
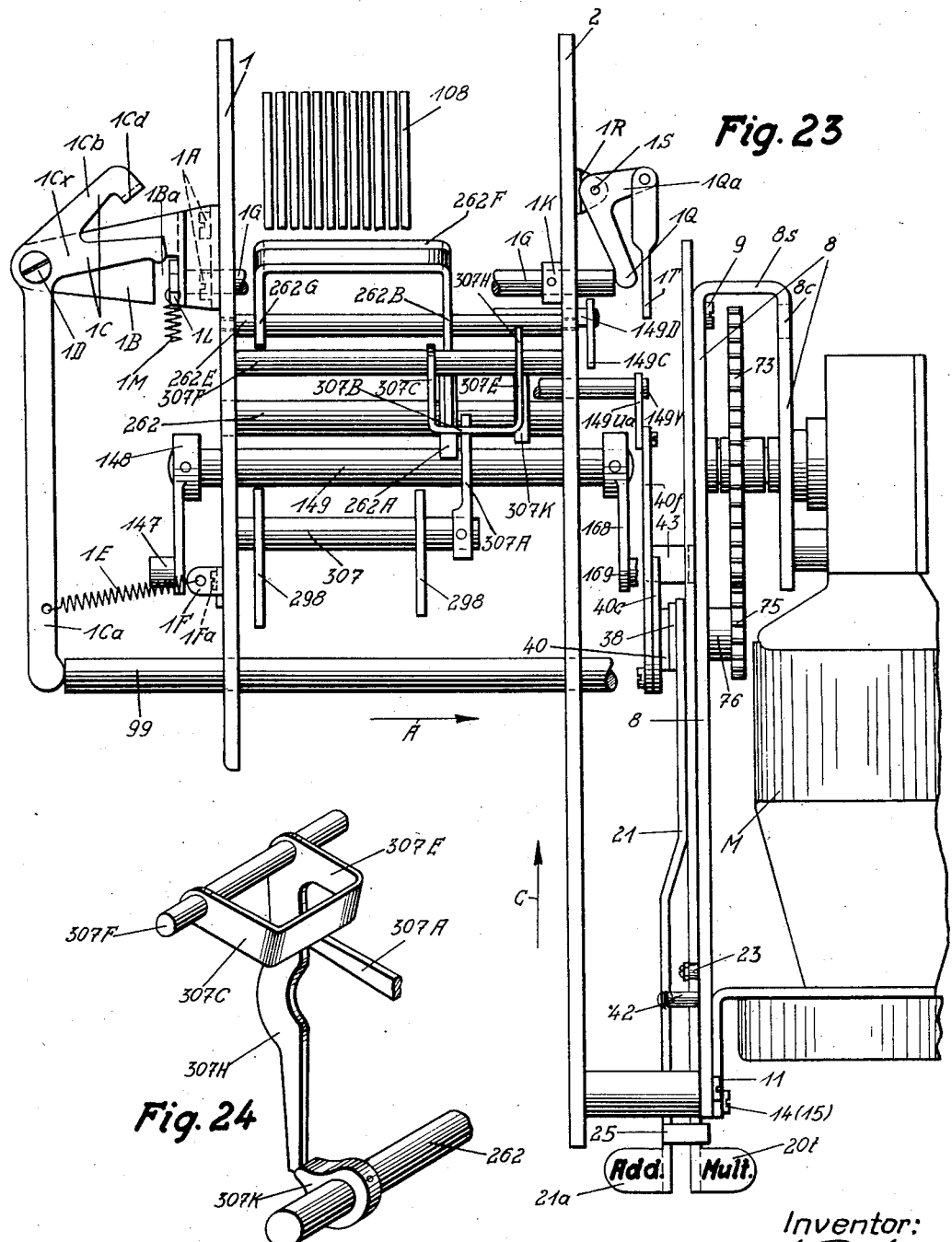
Fig. 23 is a plan of the locking mechanism for the actuator sectors and of a mechanism for restoring different parts of the totalizer into normal position.
Fig. 24 is a perspective of a detail of Fig. 22 taken from the left-hand front of the machine.
Figure 25:
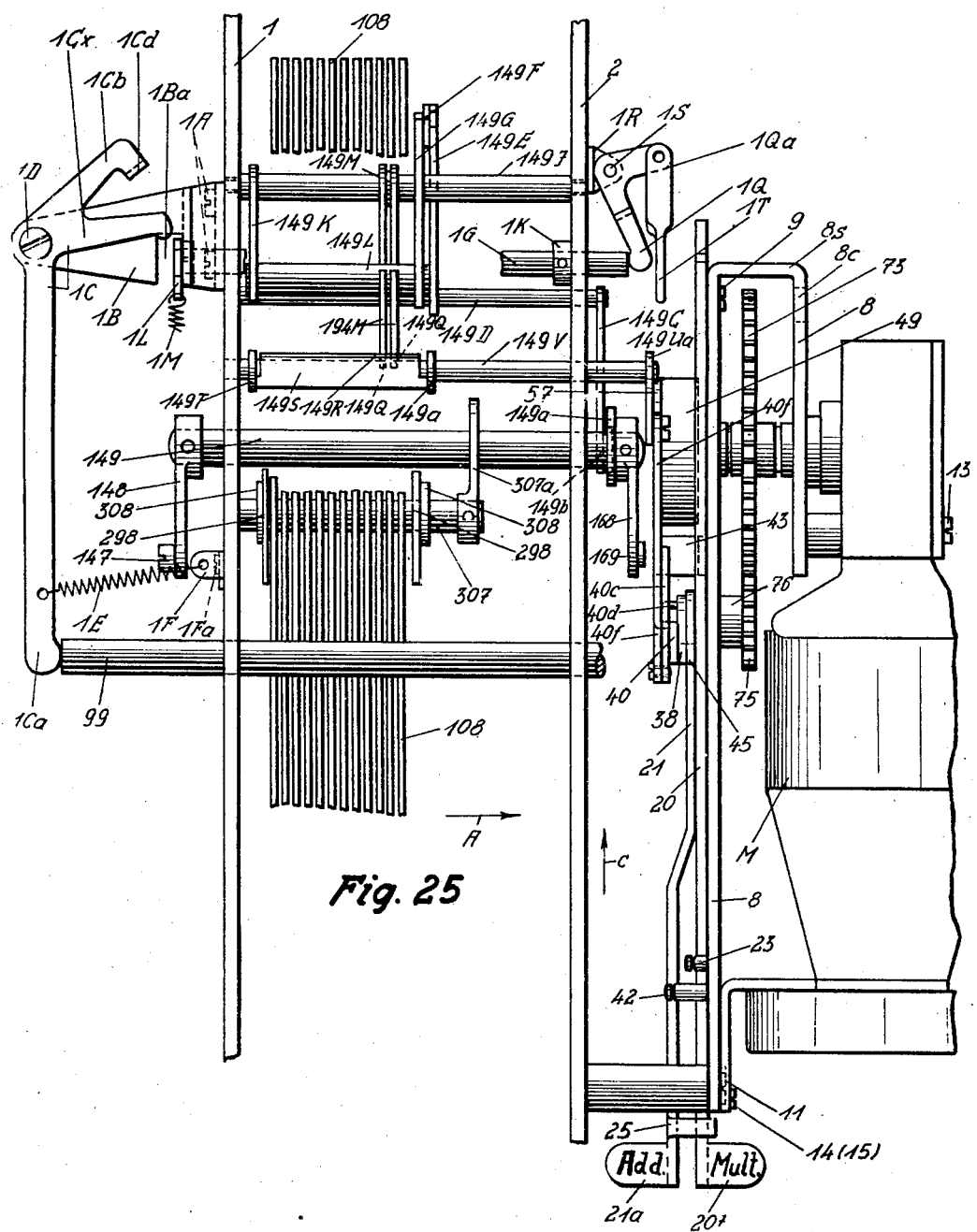
Fig. 25 is a fragmentary plan of the locking mechanism for the printing mechanism.

Two side limbs 297, 298 (Figs. 5, 17, 19, 20, 26, 27, 29 and 32) connected by two bridge members 299, 299a and forming a frame (FR) support a shaft 300 which by means of two string discs 301 (Fig. 19) is held against axial displacement. Numeral wheels 302 are rotatably mounted on the shaft 300 and each is fixed to a toothed wheel 303. The shaft 300 is extended at both ends beyond the frame FR and is displaceably mounted in slots 304 in the two side walls 1 and 2 (Fig. 3). By means of the adjustable collars 305 (Fig. 19) mounted on the two ends of the shaft 300, axial displacement of the shaft 300 is prevented. The toothed wheels 303 engage tooth-wheels 306 which latter are rotatably mounted on a shaft 307 journaled in the frame FR, the shaft 307 being prevented from axial displacement by means of spring discs 308 (Fig. 19).

Levers 309 are pivotally mounted to the left of the toothed wheels 306 (Figs. 17, 19, 26, 27, 29, 30 and 32) and at their journaled ends, are provided with slots 310 (Figs. 26, 27, 29 and 32) through which the keys 311 arranged on the shaft 307 project. The levers 309 lie in the plane of the numeral wheels 302 and are fork-shaped at their free ends. A rod 312 is mounted in the frame FR by means of screws 315 (Fig. 19) fitted in the side plates 297 and 298 and pivotally supports levers 314 which latter are prevented from axial displacement by means of the distance rings 314a.

Figure 17:
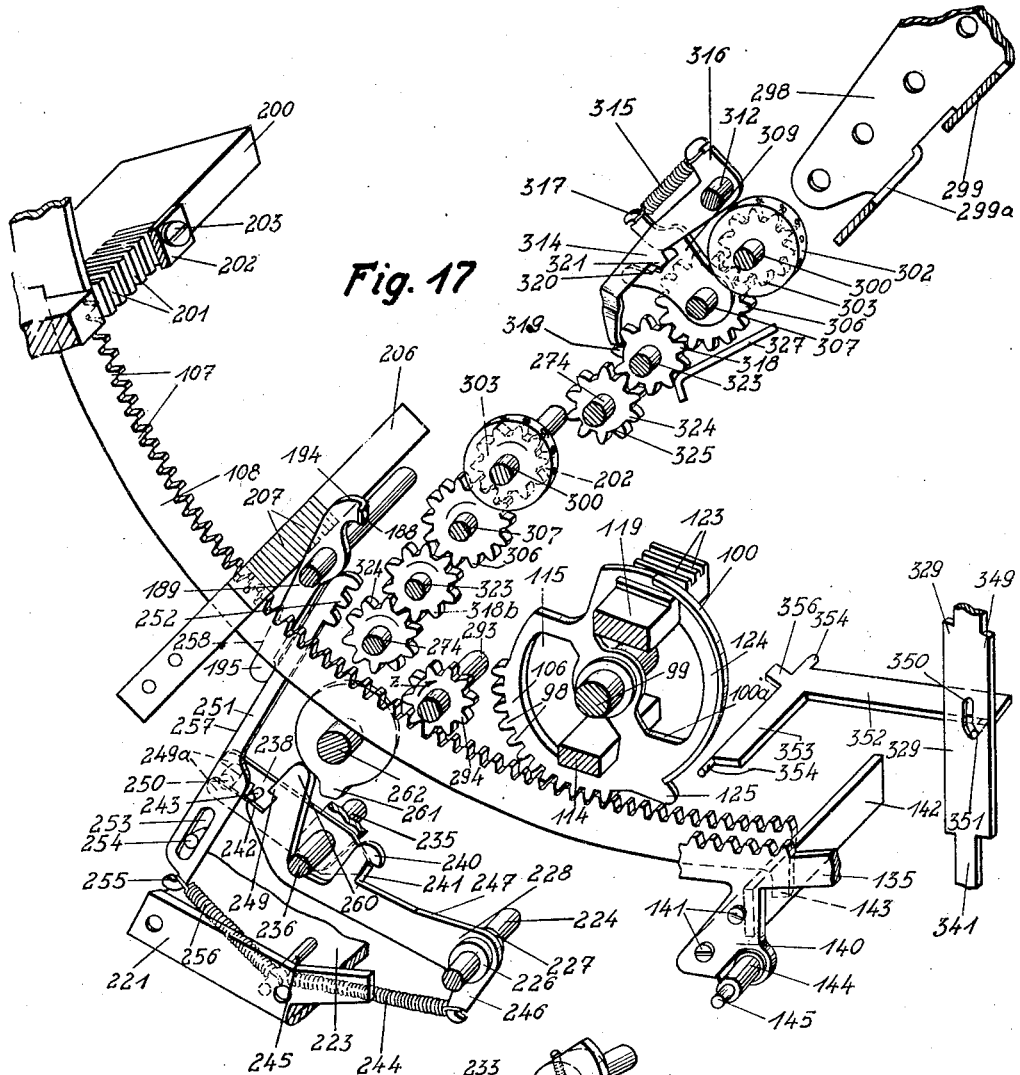
Fig. 17 is a perspective taken from the left-hand front of the machine of a denomination of the calculating mechanism.

The levers 314 are held swung on the rod 312 in the anti-clockwise direction, by springs 315 engaged at 316 and 317 with the levers 314 and 309 respectively. Since each lever 314 is positioned at the left of its numeral wheel 302 and must nevertheless co-act with a broad tooth 319 of a pinion 318 of the next lower denomination located to the right of the lever. Hence, the lever 314 at its lower end is offset to the right, as is shown in Fig. 17. The toothed wheels 318 are provided, on the side opposite that from which the broad teeth 319 project, with hubs 318x (Fig. 19). Thus, the broad teeth 319 (Fig. 17) of the wheels 318 overlie and rotate about the hubs 318x of the wheels 318 of the respective next higher denominations without frictional resistance.

By means of the spring 315 the lever 309 is acted on in the clockwise direction about the shaft 307, the normal position of the lever 309 being determined by a shoulder 320 thereon, striking against a lateral lug 321 on the lever 314. By the co-action of the broad tooth 319 of the wheel 318 with the lever 314, the latter is rocked to its working position where it is held by the shoulder 320 of the lever 309. By said working position of the lever 314, the tens carrying mechanism may be operated as hereinafter described under the heading "Tens carrying mechanism." The toothed wheel 306 is in engagement with the above mentioned toothed pinion 318 which is formed somewhat broader than the toothed wheels 303 and 306. The pinions 318 are mounted so as to be loosely rotatable on a rod 323 fixed in the frame FR at 322. The toothed pinions 318 on the other hand, are in engagement with the toothed wheels 324 which are rotatably mounted on the shaft 274 which latter is held against axial displacement by means of spring discs 374a (Fig. 19). The toothed wheels 324 are formed broader than the toothed pinions 318 and the toothed pinion 318b (Fig. 17) of the highest denomination has no broad tooth 319.

A spring comb 327 is rigidly mounted at 326 on the bridge member 299 of the frame FR and the teeth of said comb engage in the tooth spaces of the toothed pinions 318 and thereby hold the several sets of toothed wheels 324, 318, 306, 303 in their rest or adjusted positions.

When the wheels 324 of the totalizer are brought in engagement with the teeth of the actuator sectors 108 (Fig. 27) as hereinafter described, the toothed wheels 324, 318, 306 and 303 in the totalizer are rotated in the direction of the arrows indicated in Fig. 17, so that the numeral wheels 302 rigidly mounted on the toothed wheels 303 are rotated in the positive direction to extents corresponding to the value entered into the setting and indicating wheels 100. The result registered on the numeral wheels 302 is visible through an inspection aperture Ra (Fig. 1) located in the cover plate C.

Return mechanism for totalizer levers for preparing the tens carry operable after a tens transfer in one or other of the denominations At the right-hand side of the frame FR (Figs. 5, 19 and 20), a lever 307A is rigidly mounted on the shaft 307. The lever 307A underlies the bridge 307B of the bail 307C, 307B, 307E, which latter is rockably arranged on the rod 307F. The rod 307F is fixed in the side walls 1 and 2. The downwardly directed arm 307H of the bail part 307E is engageable by the cam 307K rigidly mounted on the shaft 262. This mechanism after a tens transfer in one or other of the denominations, brings the corresponding lever 314 into its normal position.

Figure 32:
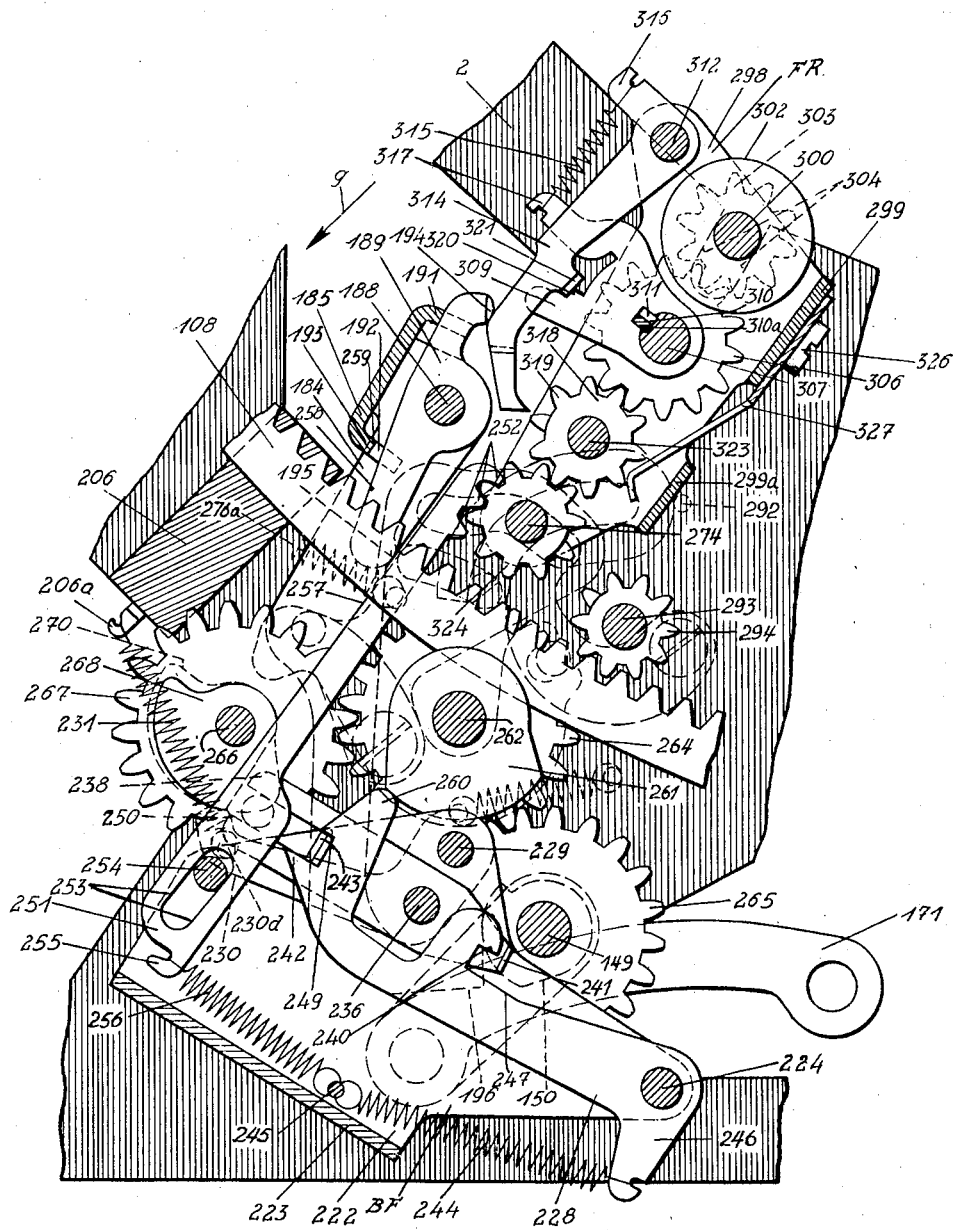

When a tens transfer takes place, in the rotation of the numeral wheels 302 from "9" to "0," the parts 314 and 309 are moved into the position, shown in Fig. 32 in a manner as described hereinafter under the heading "Tens carrying mechanism." Thus the lever 314 (Fig. 32) is swung in the clockwise direction about the rod 312 and is held by the shoulder 320 of the lever 309 in this out-swung position. Shortly before completion of a revolution of the main drive shaft 48 (Fig. 8), the cam (Fig. 24) acts upon the nose 308Ha of the lever 307H (Fig. 20) and rocks the same round the rod 307F in the clockwise direction. By this operation the bail 307C, 307B, 307E is also rocked in the same direction and acts upon the lever 307A, whereby the shaft 307 is turned in the anti-clockwise direction. The key 311 acts on edge 310a (Fig. 32) of the slot 310 of the lever 309 and swings the same in the anti-clockwise direction round the shaft 307, against the action of the spring 315 which is thereby tensioned. The shoulder 320 of the lever 309 releases the lug 321 of the lever 314 so that the latter under the action of the tensioned spring 315 can swing back round the rod 312 in the anti-clockwise direction into the rest position illustrated in Fig. 17.

Totalizer engaging and disengaging mechanism

Figure 18:
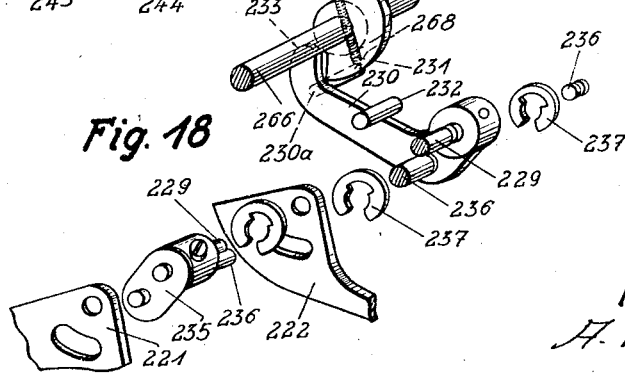
Fig. 18 is a perspective detail of parts shown in Fig. 17, viewed from the left-hand of the machine.

A toothed wheel 264 is rigidly mounted on the shaft 262 (Figs. 4, 5, 19, 20) and meshes with wheels 265 and 267 fixed to the shafts 149 and 266, respectively. A cam 268 (Figs. 18 and 19)

fixed on the shaft 266 is adapted, in the subtraction position of the mechanisms, to coact with the nose 233 of the lever 230. Laterally of the left-hand side wall 1 of the machine, the shaft 266 is provided with a rigid cam 269 (Figs. 4 and 19), and laterally of the right-hand machine side wall 2 the shaft 266 is provided with a rigid cam 270 (Figs. 4, 19, 27, 28, 30 and 31). The two cams 269, 270, according to whether the shaft 266 is moved to the addition or subtraction position, are capable of acting on levers to be hereinafter described. In this arrangement the shaft 266 is displaced by hand into one or the other position by the following mechanism.

A sleeve 266A having a groove 266B (Figs. 4, 20 and 21) is rigidly arranged on the shaft 266 and a pin 266E which is fixed to a lever 266D, projects into the grove 266B. The lever 266D is pivotally mounted at 266C on a bracket 266F, the latter being secured at 266H to the side wall 2. The upper end of the lever 266D projects through a slot 266M (Figs. 1 and 21) in the cover plate C of the machine and is provided with a knob 266N, the cover plate C being provided with the abbreviations "Sub." and "Add."

In the registration of a value additively, the shaft 266 and the cams 269, 270, 268 arranged on it are displaced to the right, as shown in Fig. 4. In this position the lever 287 (Figs. 3, 19) is not within the path of movement of the cam 269 so that therefore in the rotation of the cam 269 the lever 287 slides with its nose 288 on the hub of the cam 269, while the nose 280 of the lever 272 is capable of co-acting with the cam 269 for the purpose of bringing the totalizer in working position for additive calculation.

The cam 270 (Figs. 4 and 19, 28 and 31) which is arranged on the right end of the shaft 266 is capable of co-acting in the addition position of the parts 269, 266, 268 and 270 represented in Fig. 4, with the lever 272a, while the lever 287a is out of the working position in relation to the cam 270.

The cam 268 (Figs. 18 and 19) attached to the shaft 266 is moved out of the operative position in relation to the lever 230, in the addition position (Fig. 4) of the parts 269, 266, 268 and 270, that is to say, in additive calculations the cam 268 remains in inoperative position with relation to the lever 230.

The lever 272 is pivotally mounted on the side wall 1 at 271 and is provided with a curved slot 273, into which latter the shaft 274 (Fig. 3) of a totalizer projects. The lever 272 is provided with a further slot 272x (Fig. 3) through which a pin 275 projects which serves as an additional guide. By means of a spring 276 (Figs. 3, 4) connected at 278 with the wall 1 and at 277 with the lever 272, the latter is always urged in the anti-clockwise direction about the screw 271. In its normal position, the lever 272 engages a stationary pin 279.

The lever 282 is pivotally mounted at 281 on the side wall 1, the curved slot 283 thereof also receiving the shaft 274 and a spacing member 284 (Fig. 4) being located between the lever 282 and the machine wall 1. On the lever 282 is arranged a pin 285 (Fig. 3) which is engaged in a slot 286 of the lever 287, the latter being pivotally mounted at 271. The nose 288 of the lever 287 is adapted to cooperate with the cam 289 in the subtraction position of the mechanism, as shown in Fig. 19. By means of the spring 291 (Fig. 3) connected at 289 to the lever 287 and at 290 to the side wall 1, the lever 287 is urged in the anti-clockwise direction, acting on the lever 282 through the pin 285, the lever 282 is normally held against a stop pin 292.

The set of levers shown in Fig. 31 which are arranged on the outside of the right-hand side wall 2 correspond identically in form and operation with the levers 272, 282, 287 arranged on the left-hand wall 1, and a detail description of them will not, therefore, be given. For convenience, the levers of the right-hand set are identified by the same reference numerals as those in the left-hand set with the index a added.

The toothed wheel 267 (Figs. 5, 19, 20, 26, 27, 29, 30 and 32) on the shaft 266 is driven from the shaft 149 through the toothed wheels 264 and 265, and the cams 269, 270 (Figs. 4 and 19) and 268 (Figs. 18 and 19) rigidly mounted on the shaft 266 are rotated thereby in the directions of the arrows indicated in Fig. 5. The cam 269 operates the nose 280 of the lever 272, whereby the last mentioned lever is swung in the clockwise direction about the pivot 271 against the tension of its spring 276. The cam 270 (Figs. 4, 19 and 28) acts simultaneously on the nose 280a of the lever 272a and swings the latter about the axis 271a likewise in the clockwise direction. The edges 273a (Fig. 3) and 273aa of the levers 272 and 272a are so disposed as to move the shaft 274 (Fig. 17) of the totalizer, in the direction of arrow g (Fig. 27) whereby the toothed wheels 324 are brought into mesh with the teeth 107 of the actuator sectors 108. In this position, the shaft 274 of the totalizer, as is shown in Figs. 27 and 28 is located in the rear horizontal portion of the slots 273 and 273a of the levers 272 and 272a. The shaft 274, as is evident from Figs. 27 and 28, simultaneously slides in the slot 283, in the lever 282 and in the slot 283a of the lever 282a (Figs. 27 and 28) downwardly in the direction of arrow g along the edge 283a of the slot 283 in the lever 282 and on the edge 283aa of the slot 283a of the lever 282a (Figs. 27 and 28). The levers 272a, 282a located on the right-hand side of the machine thus take up the position in relation to one another as the levers 282 and 272. The engagement of the wheels 324 of the totalizer with the actuator sectors 108 is effected during the time which the lever systems 148, 146 (Figs. 3 and 15) and 168, 171 move out of their dead center position.

Figure 26:
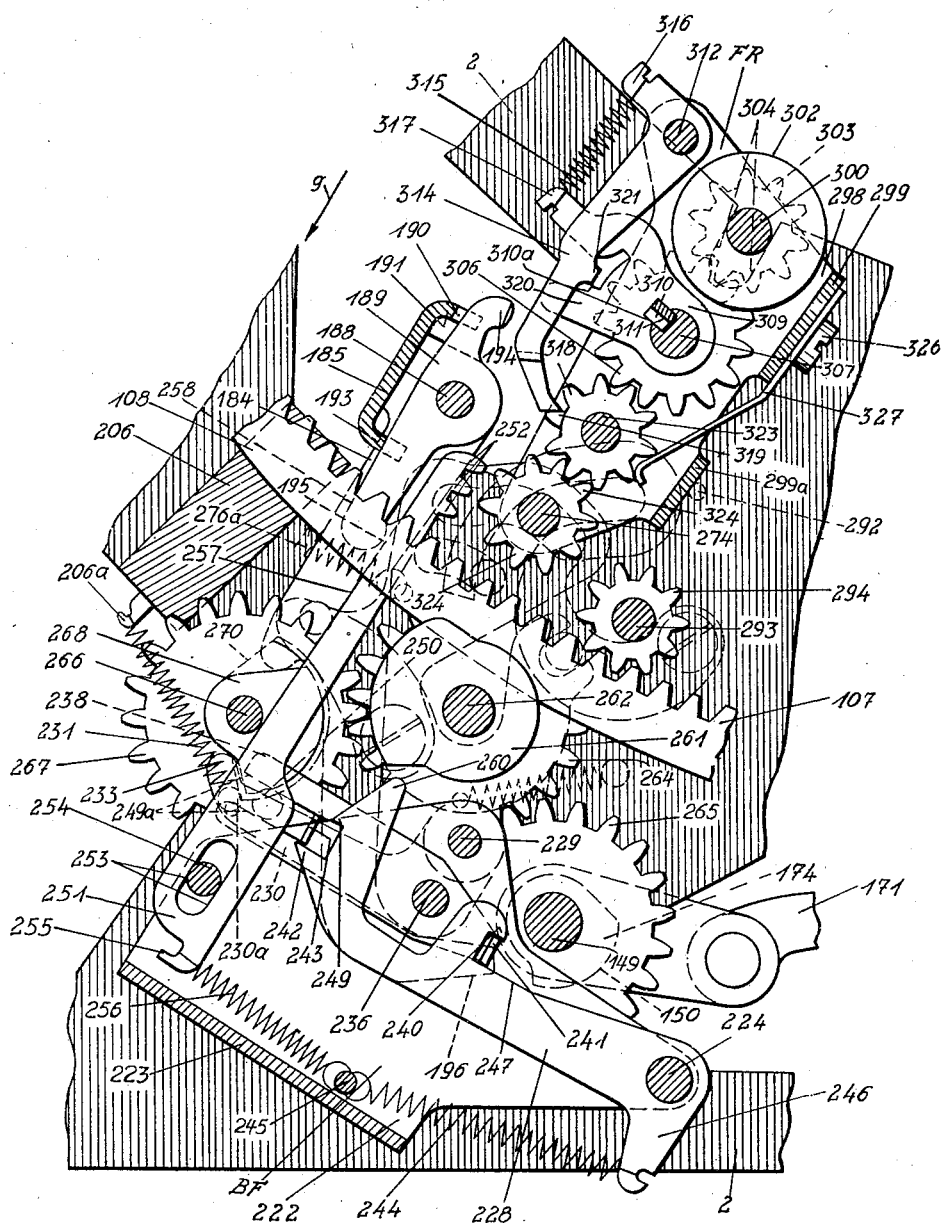

After approximately one-half of a revolution of the main drive shaft 48 the noses 280 and 280a of the levers 272 (Fig. 3) and 272a (Fig. 28) slide off of the cams 269 and 270, whereby under the pull of the springs 276 and 276a (Fig. 4), the levers 272 and 272a return to their positions illustrated in Figs. 3 and 26. The edges 273b (Fig. 3) and 273ba (Fig. 28) of the cam slots formed in the levers 272, 272a act on the shaft 274 and move the latter back again into the normal position illustrated in Figures 5 and 26, during which the shaft 300 of the totalizer is guided in the slot 304 in side walls 1 and 2 of the machine.

Tens carrying mechanism

A yoke consisting of the two levers 183 and 184 (Figs. 5, 15, 17, 19, 26, 29 and 32) as well as the bridge member 185 is pivotally mounted at 186 and 187 on the side walls 1 and 2. A shaft 188 is rotatably mounted in the levers 183 and 184 and is held against axial movement by spring discs 188a (Fig. 19). Pawls 189 (Figs. 17 and 19) are pivotally mounted on the shaft 188 and are guided in grooves 190 and 192 in flanged portions 191 and 193 of the bridge member 185. The pawls 189 are provided at their upper ends with lateral noses 194 (Figs. 17, 19, 26, 29 and 32) adapted to co-act with the depending levers 314. The noses 195 on the lower ends of the pawls 189 act on their respective rack pawls 257. The laterally directed lower ends 196 and 197 (Figs. 15, 26, 29 and 32) of the levers 183 and 184 co-act with cams 150 and 174 fixed to the shaft 149.

A U-shaped bearing frame BF comprising the end flanges 221, 222 and a bridge member 223 (Figs. 5, 26, 29 and 32) is rigidly secured at 220 (Figs. 3 and 19) on the left-hand side wall 1. On a shaft 224, mounted in the frame BF is arranged an adjustable collar 226 and to the right of this collar a distance piece 227 is disposed. Laterally of the distance piece 227 a series of eleven levers 228 with additional interposed distance pieces 227 is arranged in the frame BF whereby lateral displacement of the levers 228 is prevented.

A lever 230 is secured on a shaft 229, which is mounted in and projects from the right-hand side of the frame BF (Figs. 18, 19, 26, 29 and 32). This lever 230 and the shaft 229 are acted upon in the clockwise direction by a spring 231 connected at 206a with the guide 206 (Fig. 5) and with the lever 230 whereby the latter in its normal position engages a stop pin 232. The nose 233 (Figs. 18, 19, 26 and 29) of the lever 230, is capable of co-acting with a cam 268 on shaft 266. A retaining disc 234 (Fig. 19) is provided to prevent axial displacement of the shaft 229. Inside of the frame BF a further lever 235 (Figs. 17, 19 and 19) is rigidly mounted on the shaft 229 and a shaft 236 is mounted in the levers 230 and 235, the shaft being held from axial displacement by two spring discs 237. Levers 238 (Figs. 17 and 19) of the form shown in Fig. 17 are pivotally mounted on the shaft 236 and are suitably held in proper spaced relation.

On each of the levers 228 (Figs. 17, 26, 29 and 32) a nose 240 is formed, which engages over a lateral lug 241 of the lever 238 when the levers 228 and 238 are located in the addition position represented in Fig. 17. An additional nose 242 of the lever 228 engages upwardly against a right-angled lug 243 of the lever 238 and springs 244, connected with a pin 245 and with arms 246 of the levers 228, normally tend to turn said levers 228 in the clockwise direction about the shaft 224, whereby in their normal position the edges 247 of the levers 228 engage the lug 241 of the levers 238 and the noses 242 of the levers 228 engage the lugs 243 of the levers 238. The nose 249 of the lever 228 is adapted to co-act with the lug 243 of the lever 238 in a manner which will be hereinafter described under the heading "Subtraction operation."

The levers 238 are provided at their rearwardly directed ends with a slot or mouth 249a (Fig. 17) receiving pins 250 (Figs. 17, 26, 29 and 32) which are fixed to carrying racks 251. The carrying racks 251 are offset at their upper ends as shown in Figs. 17 and 19 and are provided with three teeth 252 which are adapted to engage the toothed wheels 324 of the totalizer. The lower ends of the carrying racks 251 are provided with elongated holes 253 through which projects a guide rod 254 mounted in the frame BF. When the carrying racks 251 are located in their rest positions represented in Fig. 17, the rod 254 is located in the center of the elongated holes 253 so that the carrying racks may be either raised or lowered. The carrying racks 251 are acted upon in anti-clockwise direction by the springs 256 connected at 255 and 245 and in their normal positions are held with their edges 257 against the noses 195 of the pawls 189 which latter, in turn, are normally positioned with their edges 258 against edges 259 (Figs. 29 and 32) of the comb guide 193 of the yoke 183, 185, 184. Between the carrying racks 251 distance pieces 251a (lower part Fig. 19) are arranged and an adjustable collar 251b retains the rod 254 in place. The levers 228 are provided with projections 260 which are adapted to co-act with the cams 261 non-rotatably mounted on the shaft 262 mounted in the two side walls 1 and 2 of the machine, and held against axial displacement by adjustable collars 263 (Fig. 19). By arranging the actuator sectors 108 between the cams 261, as illustrated in Fig. 19 the latter are held in proper spaced relation. The cams 261 are arranged in the form of a helix on the shaft 262, so that they come into engagement from right to left one after another on the projections 260 of the levers 228.

If now, for example, a value has been set up in the numeral wheels 302 in a preceding calculating operation and by a succeeding operation an amount is accumulated which necessitates a tens transfer to the next higher denomination the following operations take place.

Let it be assumed that in the third denomination from the right the value "6" has been registered by a preceding calculating operation and that now the value "5" is to be added. In the rotation of the numeral wheel 302 (Fig. 17) of the third denominational place from "9" to "0" the wide tooth 319 on the toothed pinion 318 acts on the lever 314 and swings the same in the clockwise direction about the rod 312 and against the action of the spring 315. As soon as the lug 321 of the lever 314 slides off of the nose 320 of the lever 309, the latter is swung in the clockwise direction about the rod 307 under the action of the spring 315 and is thus positioned with its shoulder 320 (Fig. 29) in front of the lug 321 of the lever 314 so that after the tooth 319 of the toothed pinion 318 has released the lever 314, the latter is prevented from returning into its rest position illustrated in Figure 26.

In the second half of the revolution of the main drive shaft 48, the cams 150 and 174 (Fig. 15) on the shaft 149 engage and swing the depending levers 183 and 184 about the pivots 186 and 187 (Fig. 19) in the clockwise direction and the pawls 189 are carried with the shaft 188.

As above stated, the pawls 189 are held in their rest positions by the springs 256 acting through the carrying racks 251, and during the swinging of the yoke 183, 185, 184, the noses 195 of the levers 189 which have not been swung rearwardly for a tens transfer operation, bear on the edges 257 of the carrying racks 251, and swing the latter somewhat in the clockwise direction about the rod 254 against the action of the spring 256 without, however, actually engaging the teeth 252 with the toothed wheels 324 of the totalizer.

Figure 29:
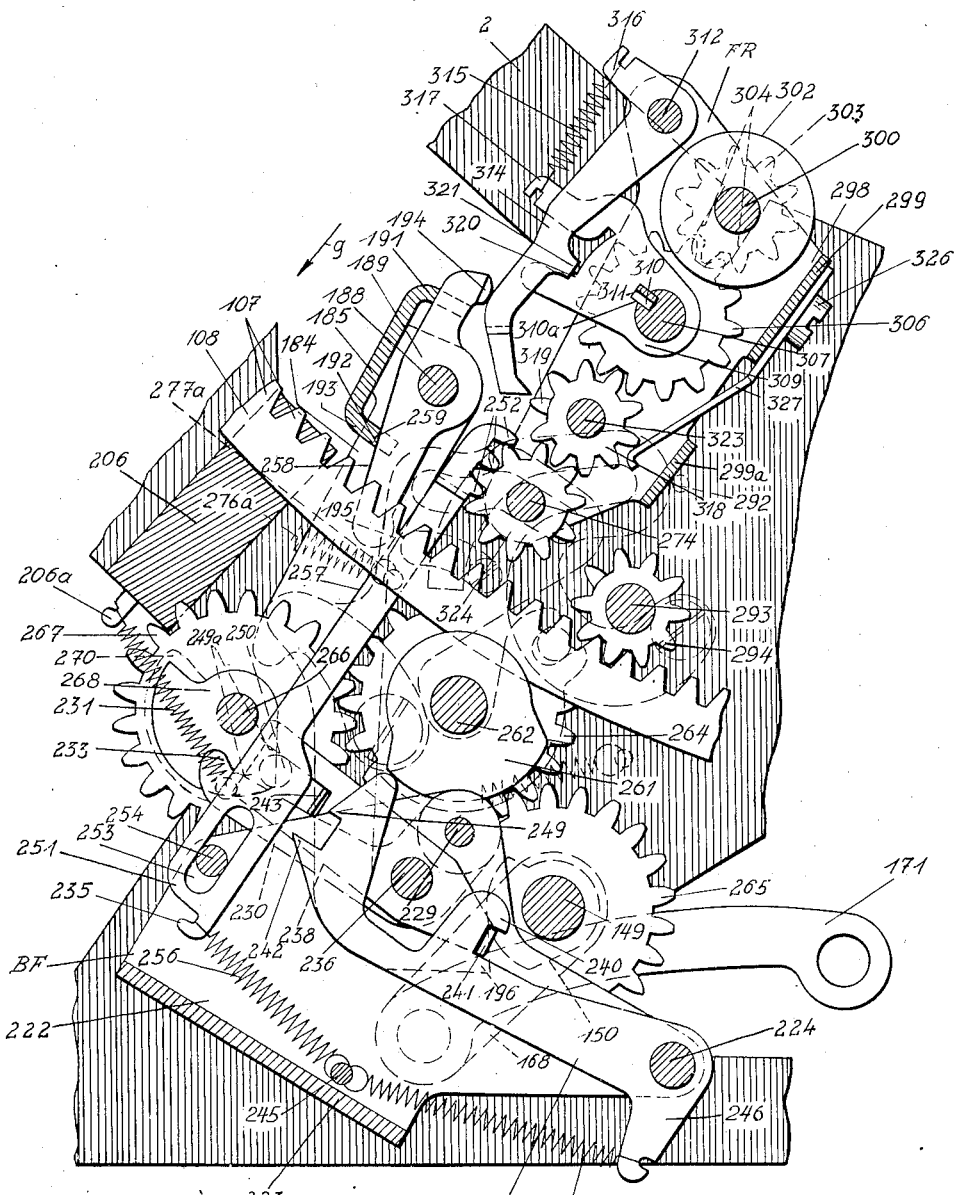

On the other hand, in the swinging of the yoke 183, 185, 184, the nose 194 of the lever 189 contacts the lever 314, which, as above stated, has been swung outwardly and since this lever 314, in consequence of the lock at 321, 320 cannot be returned to its rest position, the lever 189 is swung about the shaft 188 in the anti-clockwise direction, whereby the nose 195 thereof acts on the edge 257 of the carrying rack 251 and the latter is swung about its rod 254 in the clockwise direction against the action of the spring 256, and engages its teeth 252 with the toothed wheel 324 of the fourth denomination from the right (Fig. 29).

As soon as the teeth 252 of the carrying rack 251 of the third denomination have moved into engagement with the toothed wheel 324 of the fourth denomination, the helically arranged cams 261 on the shaft 262 act successively and beginning from the right on the projections 260 of the levers 228, whereby the levers 228 are swung about the shaft 224 in the anti-clockwise direction against the action of their springs 244. The noses 240 of the levers 228 act on the lugs 241 of the levers 238 and swing the latter in the clockwise direction. Since the slots 249a embrace the pins 250 of the carrying racks, the latter are moved upwardly. The carrying racks 251, with the exception of that in the fourth denomination from the right, are in inoperative position and are, therefore, ineffective. The teeth 252 of the operative carrying rack 251, however, being engaged with the toothed wheel 324 of the fourth denomination of the totalizer, rotate this wheel 324 through one tooth space in the arrow direction indicated in Fig. 17, whereby the numeral wheel 302 of the fourth denomination is rotated through one unit distance in additive direction by way of the toothed wheels 318, 306 and 307.

Shortly before the completion of a revolution of the shaft 149, the cams 150 and 174 disengage the depending levers 183 and 184 of the yoke 183, 185, 184 and the latter is swung in the anti-clockwise direction under the action of the springs 256, acting through the carrying racks 251, back into its normal position represented in Figs. 5, 20 and 26.

As soon as the carrying rack 251 (Fig. 17) of the third denomination with its teeth 252 is out of engagement with the toothed wheel 324 of the fourth denomination from the right, and the helically arranged cams 261 on the shaft 262 have all released the projections 260 of the levers 228, the levers 228 return to their normal positions under the action of the springs 244 in the clockwise direction about the shaft 224.

*Adding operation*

The motor M is set in operation by adjustment of the handle E. After a desired value is set up in the setting and indicating wheels 100 by depression of the corresponding calculating keys 328, as described under the heading "Setting and indicating mechanism," if this value is to be brought into the machine additively, the key 21a (Figs. 1, 7 and 9) is depressed, whereby the key lever 21 (Fig. 9) is rocked in the clockwise direction against the tension of the spring 41. The angle-lever 40 is rocked in the anti-clockwise direction about the fixed pivot 44 through the intermediary of the connecting rod 38 and consequently the nose 40c of the auxiliary clutch disabling dog 40a is moved into the path of movement of the nose 36 of the coupling pawl 59. Simultaneously the lever 1L (Fig. 22) is moved into line with the levers 148 and 1Cx through the intermediary of the parts 1W, 1U (Fig. 9), 1T, 1Q (Figs. 3, 4, 22, 23 and 25) and 1G.

In the depression of the key 21a and the rocking of the key lever 21 in the clockwise direction, the lug 25 mounted on the key lever 21 acts on the key lever 20 and rocks the latter about the pivot 19. In this movement the rear projection 26 of the key lever 20 lifts the bridge 27a and swings the clutch disabling dog 27 about the pivot 29, releasing the nose 36 and consequently the coupling 49 is closed as described under the heading "Coupling mechanism" and is rotated in the direction x.

The levers 108 and 148 and the shaft 149 (Figs. 3, 4, 15, 22, 23 and 25) are rotated by the coupling 49 in the arrow direction x and wheels 324 of the totalizer are brought in engagement with the teeth of the actuator sectors 108 as described under the heading "Totalizer engaging and disengaging."

After the totalizer wheels are thus engaged, the toothed sectors 135 and 161 are shifted in the direction C returned to their zero positions (Figs. 5 and 15).

The actuator sectors 108 are released by the restraining bar 142 and the setting and indicating wheels 100 are turned to an extent, depending on the setting thereof, by the beam 119, as above described. The actuator sectors 108 standing in engagement with those setting and indicating wheels 100 which were set to indicate the item to be added, are actuated by said wheels and the value is transferred into the numeral wheels 302 through the respective gear trains 324, 318, 306, 303. As above stated, after approximately one half of a revolution of the main drive shaft 48 the totalizer is shifted to its normal position (Figs. 5 and 26). When during continued rotation of shaft 48, the nose 36 (Figs. 9 and 12) of the coupling pawl 59 engages and tilts the tooth 40c, the hammers 149M are released through the linkage 40f, 149Ua, 149T, 149S, 149U, 149R. Consequently the hammers 149M strike against the printing types T, whereby the set value is printed upon the sheet on the platen S. During the typing of the value upon the platen S, the actuator sectors 108 are locked in their adjusted positions, as described under the heading "Locking mechanism for the actuator mechanism."

At the same time the indicating and adjusting wheels 100 are slid to the right to their normal positions, through the cooperation of the crank 148 with parts 1L, 1Cx, 1C, and 99 as described above under "Automatic zeroizing mechanism."

After the performance of the above operations is effected, the key 21a is released whereby the key lever 21 is returned by spring 41 to position illustrated in Fig. 9, and the levers 40 and 40a are swung to inoperative position about the pivot 44 through the connecting rod 38 until the extension 45 is arrested by the pin 46.

The nose 36 is thus released by the tooth 40c and the coupling 49 is again closed, whereby the latter again participates in the further rotation of the motor shaft 48.

During the return of the lever 21, the lug 25 is lifted and the lever 20 under the action of the spring 22 is likewise restored to normal position, the rear end of the lever releasing the clutch disabling pawl 27, which rocks in the anti-clockwise direction to interpose its tooth 35 into the path to arrest the nose 36 of the coupling pawl 59.

When the tooth 40c (Figs. 9 and 12) of the clutch disabling dog 40a releases the nose 36 incident to the above described return of the lever 21, the parts 40f, 149Ua, 149T, 149U, 149S and 149R return to normal position (Fig. 5) and the hammers 149M are also restored to their rest positions through the parts 149A, 149C (Figs.

5 and 20) 149E, 149F and the bail 149K, 149L, 149H in which position the hammers are held by the locking bail 149T, 149U, 149S.

Subtraction operation

A shaft 293 (Figs. 4, 5, 17, 20, 26, 27, 30 and 32) is mounted in the walls 1 and 2 and on which toothed wheels 294 are arranged so as to be loosely rotatable, the wheels 294 engaging in the teeth 107 of the actuator sectors 108.

If now a subtraction operation is to be performed with the machine it is first necessary to set the subtraction key lever 266D (Fig. 21) in the "Sub." position whereby the shaft 266 is moved from the right-hand position occupied for addition to the left into the position illustrated in Fig. 19, and the cam 269 moves out of operative position relative to the lever 272 and into working position with respect to the lever 287. The same adjustment of the cam 270 with respect to the cams 272a and 287a also occurs at the right side of the machine. Also during the left-hand displacement of the shaft 266 the cam 268 (Fig. 18) rigidly mounted thereon comes into cooperative relation to the lever 230.

After the value has been entered in the setting and indicating wheels 100 in the manner already described and the coupling is closed by depression of the key 21a, the coupling casing 49 commences to rotate. Immediately after the commencement of the rotation, the cams 269 and 270 act on the levers 287 and 287a and swing the same round their axes 271 and 271a in the clockwise direction against the action of the springs 291 and 291a. The slots 286 and 286a of the levers 287 and 287a act on the pins 285 and 285a of the levers 282 and 282a and swing the latter about the pivots 281 and 281a in the anti-clockwise direction. The edges 283b and 283ba (Figs. 28 and 31) of the slots 283 and 283a act on the shaft 274 of the totalizer, whereby the latter with its frame FR is swung about the shaft 300 in the anti-clockwise direction, and the toothed wheels 324 move into engagement with the toothed wheels 294 (Fig. 30).

As a result, when the setting and indicating wheels 100 are actuated and the toothed wheels 294 rotated by way of the actuator sectors 108 in the arrow direction Z, the toothed totalizer wheels 324, 318, 306 and 303 in the denominations in which a value has been set, are rotated in the direction opposite the arrows indicated in Fig. 17 so that the numeral wheels 302 are rotated in subtractive direction.

Shortly before the termination of the first half of the revolution of the main drive shaft 48, the cams 269 and 270 disengage the levers 287 and 287a and the latter are swung under the influence of the springs 291 and 291a in the anti-clockwise direction. Accordingly the levers 282 and 282a are swung in the clockwise direction by way of the pins 285 and 285a and the edges 283d (Fig. 3) and 283da of the slots 283 and 283a act on the totalizer shaft 274 whereby the latter and its frame FR are swung back in the clockwise direction into the rest position illustrated in Fig. 26.

Thereupon the cam 268 (Fig. 18) acts on the nose 233 of the lever 230 and swings the latter together with the shaft 229 in the anti-clockwise direction against the action of the spring 231. The shaft 236 (Figs. 18 and 17) mounted in the levers 230 and 235 is swung in the anti-clockwise direction. Consequently, the levers 238 pivotally mounted on the shaft 236 are acted upon in the opposite direction of the arrow C, whereby the lugs 241 of the levers 238 disengage from the noses 240 of the levers 228, while the lugs 243 of the levers 238 are positioned underneath the noses 249 of the levers 228 as shown in Fig. 32.

In the further rotary movement of the shaft 262 (Figs. 5 and 17) the cams 261 engage the projections 260 of the levers 228 and the latter are swung in the anti-clockwise direction round the shaft 224 and against the action of the springs 244.

The noses 249 of the levers 228 act on the lugs 243 of the levers 238, whereby the latter are swung in the anti-clockwise direction round the shaft 236. Since the fork-shaped ends 249a of the levers 238 embrace the pins 250 of the carrying racks 251, the latter are moved downwardly in succession according to the helical arrangement of the cams 261.

In case any of the tens transfer levers 314 have been actuated during the reverse rotation of the totalizer wheels for subtraction, said levers coact with the moving carrying racks 251 to engage the teeth 252 of the latter with the corresponding toothed wheels 324, the toothed wheels 324, 318, 306 and 303 being thereby rotated in direction opposite the arrows indicated in Fig. 17 whereby the numeral wheel 302 of next higher denomination is rotated back through one unit.

After a tens transfer is completed, the cam 268 disengages the nose 233 of the lever 230 (Fig. 18) and the lever 230 is returned under the influence of the spring 231 into the rest position illustrated in Fig. 5.

The shaft 236 describes an arc about the shaft 229, whereby the levers 238 (Fig. 17) are moved rearwardly, the lugs 241 being re-engaged under the noses 240 of the levers 228 and the lugs 243 disengaging from the noses 249.

The remaining operations in a subtraction calculation are the same as those above described for addition and will not, therefore, be repeated.

For zeroizing the accumulator 324, 318, 306, 303 and 302 a toothed wheel 295 (Figs. 4 and 20) is rigidly arranged on the shaft 293 on the left hand of each of wheels 294. Each of said toothed wheels 295 is provided with a tooth space 325"

Multiplication operation

For performing multiplication, the multiplicand is set up in the setting and indicating wheels 100 by manipulation of the keys 328. The key 20t (Figs. 1 and 7) is then depressed, whereby the rear end of the key lever 20 (Figs. 9 and 7) lifts the clutch disabling dog 27 and releases the nose 36 of the coupling pawl 59 whereupon the coupling closes, the coupling casing 49 participating in the rotation of the main drive shaft 48.

The coupling 49 remains closed and continues to operate until the key 20t of the key lever 20 is again released. After closing of the coupling the same operations occur as described under the heading "Adding operation" with the exceptions that the setting wheel carriage, which carries the setting and indicating wheels 100, after the first introduction of the value into the totalizer is not returned to its right-hand position, and also that the printing mechanism is not connected for operation for the duration of the multiplication operation. After release of the multiplication key 20t, all the mechanisms return again into their rest positions.

Since the key lever 21 and the parts 38, 40, 40a, 40f, 149T, 149S, 149N (Fig. 5) are not influenced by operation of the key lever 20 or during the multiplication process, the type-hammers 149M are held locked in their normal positions by the tooth 149R of the bail 149T, 149S, 149U, so that no printing takes place during the multiplication.

Although the parts 149B, 149C, 149E (Fig. 20), 149F, 149G, 149K, 149L and 149H (Fig. 5) are moved, as described under the heading "Adding operation" they are ineffective due to the fact that the hammers 149M are locked.

Further the setting and indicating wheels 100 are not slid to their rest positions by the part 1C, since the lever 1L controlling the operation thereof remains in inoperative position, not having been influenced by the lever 20. In order to restore the setting and indicating wheels 100 to their rest positions after completion of the multiplication operation it is necessary to rock the lever 99A (Fig. 16) about its pivot 99D to the "Cancelled" position whereby the shaft 99 and the setting and indicating wheels 100 are returned to their rest positions.

Although in the drawings only one totalizer is shown, it will be understood that a number of totalizers can be operated by the actuator sectors 108 without any difficulty.

Having now particularly described and ascertained the nature of my said invention and in what manner the same is to be performed, I declare that what I claim is:

1. In a machine of the class described, the combination with a motor; a main drive shaft; a series of accumulator wheels; actuators for the accumulator wheels; and a numeral keyboard; of a series of value-setting wheels; a motor-driven pinion located adjacent to the accumulator actuator of lowest order; means to normally lock the pinion against rotation; an escapement mechanism to feed the value-setting wheels axially into successive engagement with the drive pinion and the accumulator actuators order by order; a plurality of means controlled by the numeral keys to trip the escapement mechanism; to displace the locking means for the drive pinion; and to differentially arrest the value-setting wheels upon their rotation by the drive pinion; a key; a driven shaft, means operable thereby to restore the value-setting wheels to zero; a multiple-armed lever operable to return the series of value-setting wheels axially to their starting positions; an operating lever for the multiple-armed lever, normally positioned out of operative relation to the multiple-armed lever; means operable by the key to shift the operating lever into operative relation with the multiple-armed lever; and means actuated by the driven shaft to rock the operating lever only when the operating lever is in operative relation with the multiple-armed lever.

2. In a power-driven calculating machine having a motor; the combination with numeral keys; a series of denominational totalizer wheels; and actuators therefor; of a shaft supported for axial movement in the side frames; a series of item setting sectors mounted for rotation on the shaft, and having concentric, normally aligned openings; a plurality of oscillatory driving members rotatably mounted on the shaft and relatively to which the shaft moves axially, said oscillatory driving members having alined apertures; a restoring bar extending through the openings in the item setting sectors, and mounted for axial movement in the apertures of the oscillatory drive members, to travel axially with the item setting sectors, relatively to the oscillatory drive members; means on the restoring bar, embracing the respective item setting sectors to guide the sectors in their rotary travel and preserve their spaced relation; a numeral key controlled escapement for the series of sectors and their shaft; power-driven means engageable by successive sectors under control of the escapement, to turn the sectors; numeral key-controlled means to differentially arrest the sectors in their actuation by the power-driven means; the item setting sectors engaging the totalizer wheel actuators as the sectors escape from their power-driven rotating means; power-driven means to oscillate the restoring bar operated drive members near the start of a cycle to return the differentially adjusted item setting wheels to zero; and means to restore the item setting wheels, shaft and restoring bar axially to their starting positions.

3. In a power-driven calculating machine having a motor; the combination with numeral keys; a series of denominational totalizer wheels; and actuators therefor; of a shaft supported for axial movement in the side frames; a series of item setting sectors mounted for rotation on the shaft, and having concentric, normally aligned openings; a plurality of oscillatory driving members rotatably mounted on the shaft and relatively to which the shaft moves axially, said oscillatory driving members having alined apertures; a restoring bar extending through the openings in the item setting sectors, and mounted for axial movement in the apertures of the oscillatory drive members, to travel axially with said sectors, relatively to the oscillatory drive members; a numeral key controlled escapement for the series of sectors and their shaft; power-driven means engageable by successive item setting sectors under control of the escapement, to turn said sectors; numeral key controlled means to differentially arrest the said sectors in their actuation by the power driven means; said item setting sectors adapted to engage the totalizer wheel actuators as the item wheels escape from their power driven rotating means; power-driven means to oscillate the restoring bar operated drive members and their restoring bar to return the differentially adjusted item setting sectors to zero; a key; a normally ineffective multiple-armed lever operable to return the item setting sectors, their shaft, and the restoring bar axially to initial position; and normally idle means shiftable under control of the key, into and out of effective position relatively to the multiple-armed lever, and into and out of the path of travel of a moving part of the machine, to actuate the multiple-armed lever, whereby to restore the item setting sectors, their axially shiftable shaft, and the zero restoring bar to their initial positions.

AUGUST FRIEDRICH POTT.